United States Patent
Yu et al.

(10) Patent No.: US 12,335,966 B2
(45) Date of Patent: Jun. 17, 2025

(54) INFORMATION PROCESSING METHOD, TERMINAL DEVICE, AND NETWORK DEVICE

(71) Applicant: HUAWEI TECHNOLOGIES CO., LTD., Guangdong (CN)

(72) Inventors: Zheng Yu, Beijing (CN); Wenping Bi, Shenzhen (CN); Yubo Yang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 727 days.

(21) Appl. No.: 17/706,740

(22) Filed: Mar. 29, 2022

(65) Prior Publication Data

US 2022/0217759 A1   Jul. 7, 2022

Related U.S. Application Data

(63) Continuation of application No. PCT/CN2019/109763, filed on Sep. 30, 2019.

(51) Int. Cl.
  *H04W 72/23* (2023.01)
  *H04L 1/1812* (2023.01)
  *H04L 1/1829* (2023.01)
  *H04L 1/1867* (2023.01)

(52) U.S. Cl.
  CPC ............ *H04W 72/23* (2023.01); *H04L 1/1812* (2013.01); *H04L 1/1854* (2013.01); *H04L 1/1887* (2013.01)

(58) Field of Classification Search
  CPC ..... H04L 1/1812; H04L 1/1854; H04L 1/1887; H04W 72/23
  See application file for complete search history.

(56) References Cited

U.S. PATENT DOCUMENTS

2018/0092071 A1   3/2018 Dinan et al.
2021/0219329 A1*  7/2021 Zhou ................... H04L 1/1819

FOREIGN PATENT DOCUMENTS

CN   104065453 A   9/2014

OTHER PUBLICATIONS

R1-1903911, Huawei et al, Scheduling multiple DL/UL transport blocks, 3GPP TSG RAN WG1 Meeting #96bis, Xi'an, China, Apr. 8-12, 2019, total 14 pages.

(Continued)

*Primary Examiner* — Brian P Cox

(57) ABSTRACT

An information processing method includes receiving downlink control information from a network device, wherein the downlink control information is capable of scheduling a maximum of N transport blocks (TBs). When the downlink control information includes a first field, the first field includes (N+2) bits. A quantity L of TBs is determined based on the first field. When L is greater than 1, the L TBs can include both a newly transmitted TB and a retransmitted TB. In j consecutive bits in the first field, a bit state of only one bit is 1, bit states of j−1 bits are all 0, and j=N+1−L. k=0, a bit state of a $b_j$ bit in the first field is 1, and L consecutive bits in the first field, carry NDI of the L TBs; or k=L+1, a bit state of a $b_L$ bit in the first field is 1, and L consecutive bits in the first field, carry NDI information of the L TBs.

20 Claims, 13 Drawing Sheets

(56) References Cited

OTHER PUBLICATIONS

R1-1904383, Samsung, Scheduling of multiple transport blocks for NB-IoT, 3GPP TSG RAN WG1 Meeting #96bis, Xi'an, China, Apr. 8-12, 2019, total 7 pages.
R1-1904749, Sequans Communications, Consideration for scheduling multiple UL/DL TBs, 3GPP TSG RAN WG1 Meeting #96, Xi'An, China, Apr. 8-12, 2019, total 4 pages.
International Search Report and Written Opinion issued in PCT/CN2019/109763, dated Jun. 29, 2020, 9 pages.
Qualcomm Incorporated et al., "Scheduling of multiple DL/UL transport blocks", 3GPP TSG RAN WG1 Meeting #96bis Xi'an, China, Apr. 8-12, 2019, R1-1904528, total: 6 pages.
LG Electronics et al.,"Discussion on multiple transport blocks scheduling in NB-IoT", 3GPP TSG RAN WG1 #96bis Xi'an, China, Apr. 8-12, 2019, R1-1904616, total: 8 pages.
Extended European Search Report issued in EP19947841.3, dated Aug. 23, 2022, 7 pages.

* cited by examiner

|  |  | b0 | b1 | b2 | b3 | b4 | b5 | b6 | b7 | b8 | b9 |
|---|---|---|---|---|---|---|---|---|---|---|---|
|  | HARQ process number of a first TB |  |  |  |  |  |  |  |  |  |  |
| L = 8 | 0 | 1 | 1 | X | X | X | X | X | X | X | X |
| L = 7 | 0 | 1 | 0 | 1 | X | X | X | X | X | X | X |
|  | 1 | 0 | 1 | 1 | X | X | X | X | X | X | X |
| L = 6 | 0 | 1 | 0 | 0 | 1 | X | X | X | X | X | X |
|  | 1 | 0 | 1 | 0 | 1 | X | X | X | X | X | X |
|  | 2 | 0 | 0 | 1 | 1 | X | X | X | X | X | X |
| L = 5 | 0 | 1 | 0 | 0 | 0 | 1 | X | X | X | X | X |
|  | 1 | 0 | 1 | 0 | 0 | 1 | X | X | X | X | X |
|  | 2 | 0 | 0 | 1 | 0 | 1 | X | X | X | X | X |
|  | 3 | 0 | 0 | 0 | 1 | 1 | X | X | X | X | X |
| L = 4 | 0 | 1 | 0 | 0 | 0 | 0 | 1 | X | X | X | X |
|  | 1 | 0 | 1 | 0 | 0 | 0 | 1 | X | X | X | X |
|  | 2 | 0 | 0 | 1 | 0 | 0 | 1 | X | X | X | X |
|  | 3 | 0 | 0 | 0 | 1 | 0 | 1 | X | X | X | X |
|  | 4 | 0 | 0 | 0 | 0 | 1 | 1 | X | X | X | X |

FIG. 4a

| L = 3 | 0 | 1 | 0 | 0 | 0 | 0 | 0 | 1 | X | X | X |
|---|---|---|---|---|---|---|---|---|---|---|---|
| | 1 | 0 | 1 | 0 | 0 | 0 | 0 | 1 | X | X | X |
| | 2 | 0 | 0 | 1 | 0 | 0 | 0 | 1 | X | X | X |
| | 3 | 0 | 0 | 0 | 1 | 0 | 0 | 1 | X | X | X |
| | 4 | 0 | 0 | 0 | 0 | 1 | 0 | 1 | X | X | X |
| | 5 | 0 | 0 | 0 | 0 | 0 | 1 | 1 | X | X | X |
| L = 2 | 0 | 1 | 0 | 0 | 0 | 0 | 0 | 0 | 1 | X | X |
| | 1 | 0 | 1 | 0 | 0 | 0 | 0 | 0 | 1 | X | X |
| | 2 | 0 | 0 | 1 | 0 | 0 | 0 | 0 | 1 | X | X |
| | 3 | 0 | 0 | 0 | 1 | 0 | 0 | 0 | 1 | X | X |
| | 4 | 0 | 0 | 0 | 0 | 1 | 0 | 0 | 1 | X | X |
| | 5 | 0 | 0 | 0 | 0 | 0 | 1 | 0 | 1 | X | X |
| | 6 | 0 | 0 | 0 | 0 | 0 | 0 | 1 | 1 | X | X |
| L = 1 | 0 | 1 | 0 | 0 | 0 | 0 | 0 | 0 | 0 | 1 | X |
| | 1 | 0 | 1 | 0 | 0 | 0 | 0 | 0 | 0 | 1 | X |
| | 2 | 0 | 0 | 1 | 0 | 0 | 0 | 0 | 0 | 1 | X |
| | 3 | 0 | 0 | 0 | 1 | 0 | 0 | 0 | 0 | 1 | X |
| | 4 | 0 | 0 | 0 | 0 | 1 | 0 | 0 | 0 | 1 | X |
| | 5 | 0 | 0 | 0 | 0 | 0 | 1 | 0 | 0 | 1 | X |
| | 6 | 0 | 0 | 0 | 0 | 0 | 0 | 1 | 0 | 1 | X |
| | 7 | 0 | 0 | 0 | 0 | 0 | 0 | 0 | 1 | 1 | X |

FIG. 4a (cont)

|  |  | b0 | b1 | b2 | b3 | b4 | b5 | b6 | b7 | b8 | b9 |
|---|---|---|---|---|---|---|---|---|---|---|---|
|  | HARQ process number of a first TB |  |  |  |  |  |  |  |  |  |  |
| L = 8 | 0 | 0 | 0 | X | X | X | X | X | X | X | X |
|  |  |  |  |  |  |  |  |  |  |  |  |
| L = 7 | 0 | 0 | 1 | 0 | X | X | X | X | X | X | X |
|  | 1 | 1 | 0 | 0 | X | X | X | X | X | X | X |
|  |  |  |  |  |  |  |  |  |  |  |  |
| L = 6 | 0 | 0 | 1 | 1 | 0 | X | X | X | X | X | X |
|  | 1 | 1 | 0 | 1 | 0 | X | X | X | X | X | X |
|  | 2 | 1 | 1 | 0 | 0 | X | X | X | X | X | X |
|  |  |  |  |  |  |  |  |  |  |  |  |
| L = 5 | 0 | 0 | 1 | 1 | 1 | 0 | X | X | X | X | X |
|  | 1 | 1 | 0 | 1 | 1 | 0 | X | X | X | X | X |
|  | 2 | 1 | 1 | 0 | 1 | 0 | X | X | X | X | X |
|  | 3 | 1 | 1 | 1 | 0 | 0 | X | X | X | X | X |
|  |  |  |  |  |  |  |  |  |  |  |  |
| L = 4 | 0 | 0 | 1 | 1 | 1 | 1 | 0 | X | X | X | X |
|  | 1 | 1 | 0 | 1 | 1 | 1 | 0 | X | X | X | X |
|  | 2 | 1 | 1 | 0 | 1 | 1 | 0 | X | X | X | X |
|  | 3 | 1 | 1 | 1 | 0 | 1 | 0 | X | X | X | X |
|  | 4 | 1 | 1 | 1 | 1 | 0 | 0 | X | X | X | X |
|  |  |  |  |  |  |  |  |  |  |  |  |

FIG. 4a (cont)

| | | | | | | | | | | | |
|---|---|---|---|---|---|---|---|---|---|---|---|
| L = 3 | 0 | 0 | 1 | 1 | 1 | 1 | 1 | 0 | X | X | X |
| | 1 | 1 | 0 | 1 | 1 | 1 | 1 | 0 | X | X | X |
| | 2 | 1 | 1 | 0 | 1 | 1 | 1 | 0 | X | X | X |
| | 3 | 1 | 1 | 1 | 0 | 1 | 1 | 0 | X | X | X |
| | 4 | 1 | 1 | 1 | 1 | 0 | 1 | 0 | X | X | X |
| | 5 | 1 | 1 | 1 | 1 | 1 | 0 | 0 | X | X | X |
| L = 2 | 0 | 0 | 1 | 1 | 1 | 1 | 1 | 1 | 0 | X | X |
| | 1 | 1 | 0 | 1 | 1 | 1 | 1 | 1 | 0 | X | X |
| | 2 | 1 | 1 | 0 | 1 | 1 | 1 | 1 | 0 | X | X |
| | 3 | 1 | 1 | 1 | 0 | 1 | 1 | 1 | 0 | X | X |
| | 4 | 1 | 1 | 1 | 1 | 0 | 1 | 1 | 0 | X | X |
| | 5 | 1 | 1 | 1 | 1 | 1 | 0 | 1 | 0 | X | X |
| | 6 | 1 | 1 | 1 | 1 | 1 | 1 | 0 | 0 | X | X |
| L = 1 | 0 | 0 | 1 | 1 | 1 | 1 | 1 | 1 | 1 | 0 | X |
| | 1 | 1 | 0 | 1 | 1 | 1 | 1 | 1 | 1 | 0 | X |
| | 2 | 1 | 1 | 0 | 1 | 1 | 1 | 1 | 1 | 0 | X |
| | 3 | 1 | 1 | 1 | 0 | 1 | 1 | 1 | 1 | 0 | X |
| | 4 | 1 | 1 | 1 | 1 | 0 | 1 | 1 | 1 | 0 | X |
| | 5 | 1 | 1 | 1 | 1 | 1 | 0 | 1 | 1 | 0 | X |
| | 6 | 1 | 1 | 1 | 1 | 1 | 1 | 0 | 1 | 0 | X |
| | 7 | 1 | 1 | 1 | 1 | 1 | 1 | 1 | 0 | 0 | X |

FIG. 4b

| HARQ process number of a first TB | b0 | b1 | b2 | b3 | b4 | b5 | b6 | b7 | b8 | b9 | b10 | |
|---|---|---|---|---|---|---|---|---|---|---|---|---|
| 0 | 1 | 1 | 1 | X | X | X | X | X | X | X | X | Quantity of TBs scheduled by using DCI = 8 |
| | | | | | | | | | | | | |
| 0 | | 1 | 0 | 1 | X | X | X | X | X | X | X | Quantity of TBs scheduled by using DCI = 7 |
| 1 | | 0 | 1 | 1 | X | X | X | X | X | X | X | |
| | | | | | | | | | | | | |
| 0 | | 1 | 0 | 0 | 1 | X | X | X | X | X | X | Quantity of TBs scheduled by using DCI = 6 |
| 1 | | 0 | 1 | 0 | 1 | X | X | X | X | X | X | |
| 2 | | 0 | 0 | 1 | 1 | X | X | X | X | X | X | |
| | | | | | | | | | | | | |
| 0 | | 1 | 0 | 0 | 0 | 1 | X | X | X | X | X | Quantity of TBs scheduled by using DCI = 5 |
| 1 | | 0 | 1 | 0 | 0 | 1 | X | X | X | X | X | |
| 2 | | 0 | 0 | 1 | 0 | 1 | X | X | X | X | X | |
| 3 | | 0 | 0 | 0 | 1 | 1 | X | X | X | X | X | |
| | | | | | | | | | | | | |
| 0 | | 1 | 0 | 0 | 0 | 0 | 1 | X | X | X | X | Quantity of TBs scheduled by using DCI = 4 |
| 1 | | 0 | 1 | 0 | 0 | 0 | 1 | X | X | X | X | |
| 2 | | 0 | 0 | 1 | 0 | 0 | 1 | X | X | X | X | |
| 3 | | 0 | 0 | 0 | 1 | 0 | 1 | X | X | X | X | |
| 4 | | 0 | 0 | 0 | 0 | 1 | 1 | X | X | X | X | |
| | | | | | | | | | | | | |

Fig. 6

| | | | | | | | | | | | |
|---|---|---|---|---|---|---|---|---|---|---|---|
| 0 | | 1 | 0 | 0 | 0 | 0 | 0 | 1 | X | X | X | Quantity of TBs scheduled by using DCI = 3 |
| 1 | | 0 | 1 | 0 | 0 | 0 | 0 | 1 | X | X | X | |
| 2 | | 0 | 0 | 1 | 0 | 0 | 0 | 1 | X | X | X | |
| 3 | | 0 | 0 | 0 | 1 | 0 | 0 | 1 | X | X | X | |
| 4 | | 0 | 0 | 0 | 0 | 1 | 0 | 1 | X | X | X | |
| 5 | | 0 | 0 | 0 | 0 | 0 | 1 | 1 | X | X | X | |
| | | | | | | | | | | | | |
| 0 | | 1 | 0 | 0 | 0 | 0 | 0 | 0 | 1 | X | X | Quantity of TBs scheduled by using DCI = 2 |
| 1 | | 0 | 1 | 0 | 0 | 0 | 0 | 0 | 1 | X | X | |
| 2 | | 0 | 0 | 1 | 0 | 0 | 0 | 0 | 1 | X | X | |
| 3 | | 0 | 0 | 0 | 1 | 0 | 0 | 0 | 1 | X | X | |
| 4 | | 0 | 0 | 0 | 0 | 1 | 0 | 0 | 1 | X | X | |
| 5 | | 0 | 0 | 0 | 0 | 0 | 1 | 0 | 1 | X | X | |
| 6 | | 0 | 0 | 0 | 0 | 0 | 0 | 1 | 1 | X | X | |
| | | | | | | | | | | | | |
| 0 | | 1 | 0 | 0 | 0 | 0 | 0 | 0 | 0 | 1 | X | Quantity of TBs scheduled by using DCI = 1 |
| 1 | | 0 | 1 | 0 | 0 | 0 | 0 | 0 | 0 | 1 | X | |
| 2 | | 0 | 0 | 1 | 0 | 0 | 0 | 0 | 0 | 1 | X | |
| 3 | | 0 | 0 | 0 | 1 | 0 | 0 | 0 | 0 | 1 | X | |
| 4 | | 0 | 0 | 0 | 0 | 1 | 0 | 0 | 0 | 1 | X | |
| 5 | | 0 | 0 | 0 | 0 | 0 | 1 | 0 | 0 | 1 | X | |
| 6 | | 0 | 0 | 0 | 0 | 0 | 0 | 1 | 0 | 1 | X | |
| 7 | | 0 | 0 | 0 | 0 | 0 | 0 | 0 | 1 | 1 | X | |
| | | | | | | | | | | | | |
| | 0 | 1 | 0 | Each of the 8 bits corresponds to an indicator of one HARQ process number | | | | | | | | DCI is used to schedule a plurality of newly transmitted TBs |

Fig. 6 (cont)

| | | | | | | | | | | | |
|---|---|---|---|---|---|---|---|---|---|---|---|
| 0 | 1 | | | | | | | | | | Each of the 8 bits corresponds to an indicator of one HARQ process number | DCI is used to schedule a plurality of retransmitted TBs |

| | | | | | | | | | | | |
|---|---|---|---|---|---|---|---|---|---|---|---|
| 0 | 0 | | | | | | | | | | Three bits are used to indicate a HARQ process number, and one bit is used to indicate an NDI | Quantity of TBs scheduled by using DCI = 1 |

FIG. 6 (cont)

INFORMATION PROCESSING METHOD, TERMINAL DEVICE, AND NETWORK DEVICE

CROSS-REFERENCE TO RELATED APPLICATIONS

This application is a continuation of International Application No. PCT/CN2019/109763, filed on Sep. 30, 2019, the disclosure of which is hereby incorporated by reference in its entirety.

TECHNICAL FIELD

Embodiments of this application relate to the communications field, and in particular, to an information processing method, a terminal device, and a network device.

BACKGROUND

In a communications system, one piece of downlink control information (DCI) is used to schedule one transport block (TB) or schedule a plurality of transport blocks. When DCI is used to schedule one TB, the DCI is further used to indicate one hybrid automatic repeat request (HARQ) process number. For example, if user equipment (UE) supports eight HARQ processes, DCI is used to use three bits in 0 to 7 to indicate a HARQ process number used by a TB that is scheduled by using the DCI. When DCI is used to schedule one TB, the DCI is further used to indicate whether data transmission scheduled by using the DCI carries a newly transmitted TB or a retransmitted TB.

To reduce DCI transmission overheads and save transmission resources, one piece of DCI may be used to schedule a plurality of TBs. When one piece of DCI is used to schedule a plurality of transport blocks, the DCI may be used to indicate a plurality of HARQ process numbers. Each HARQ process number corresponds to or is associated with transmission of one transport block.

To further reduce overheads when one piece of DCI is used to schedule a plurality of transport blocks, HARQ process numbers used by the plurality of transport blocks need to be restricted to be consecutive, and a first HARQ process number in the plurality of HARQ process numbers further needs to be fixed. For example, if one piece of DCI is used to schedule N transport blocks, and a HARQ process number of a first transport block in the N transport blocks is fixed, for example, fixed to 0, HARQ process numbers of remaining N−1 transport blocks in the N transport blocks are 1, 2, . . . , and N−1.

When the DCI can be used to schedule a maximum of the N transport blocks, N bits are required to indicate new data indicator (NDI) information of each transport block by using a bitmap, and the N bits are further required to indicate, by using the bitmap, whether a HARQ process number of each transport block is used. Therefore, a total of 2N bits are required to indicate a quantity of scheduled transport blocks and NDI information of the transport blocks. Therefore, there is a problem that overheads are excessively high when a control channel is used to indicate a quantity of transport blocks and NDI information of the transport blocks.

SUMMARY

Embodiments of this application provide an information processing method, a terminal device, and a network device, to reduce indication overheads of downlink control information and improve scheduling flexibility.

To resolve the foregoing technical problem, embodiments of this application provide the following technical solutions.

According to a first aspect, an embodiment of this application provides an information processing method, including: A terminal device receives downlink control information from a network device, where the downlink control information can be used to schedule a maximum of N transport blocks (TBs), and N is a positive integer. When the terminal device determines that the downlink control information includes a first field, the first field includes (N+2) bits, namely, $b_0, b_1, \ldots,$ and $b_{N+1}$. The terminal device determines, based on the first field, a quantity L of TBs scheduled by using the downlink control information, where L is a positive integer, and $1 \le L \le N$. When L is greater than 1, the L TBs scheduled by using the downlink control information can include both a newly transmitted TB and a retransmitted TB. In j consecutive bits, namely, $b_k, b_{k+1}, \ldots,$ and $b_{k+j-1}$ in the first field, a bit state of only one bit is 1, bit states of other j−1 bits are all 0, j is a positive integer, j=N+1−L, k is a predefined integer, and k=0 or k=L+1. k=0, a bit state of a $b_j$ bit in the first field is 1, and L consecutive bits, namely, $b_{j+1}, b_{j+2}, \ldots,$ and $b_{N+1}$ in the first field, carry new data indicator (NDI) information of the L TBs scheduled by using the downlink control information; or k=L+1, a bit state of a $b_L$ bit in the first field is 1, and L consecutive bits, namely, $b_0, b_1, \ldots,$ and $b_{L-1}$ in the first field, carry NDI information of the L TBs scheduled by using the downlink control information. The terminal device determines a HARQ process number of each of the L TBs. The terminal device sends or receives the L TBs based on the determined HARQ process number of each of the L TBs and the NDI information of each of the L TBs. In this embodiment, only the (N+2) bits are required to support scheduling of any quantity of TBs in the N TBs by using the downlink control information, and HARQ process numbers and NDI information of the transport blocks can be flexibly indicated. This reduces indication overheads of the downlink control information, and further improves scheduling flexibility.

In a possible implementation, L, a HARQ process number of a first TB in the L TBs, and the NDI information of each of the L TBs are determined according to a correspondence between a bit state of the first field, and a quantity of TBs, the HARQ process number of the first TB, and the NDI information of the L TBs, and the first TB is one of the L TBs. The network device may preconfigure the correspondence between the bit state of the first field, and L, the HARQ process number of the first TB in the L TBs, and the NDI information of each of the L TBs. L, the HARQ process number of the first TB in the L TBs, and the NDI information of each of the L TBs that are corresponding to the bit state of the first field are configured in the correspondence. Therefore, L, the HARQ process number of the first TB in the L TBs, and the NDI information of each of the L TBs can be quickly determined by querying the correspondence between the bit state of the first field, and L, the HARQ process number of the first TB in L TBs, and the NDI information of each of the L TBs, so that the terminal device can parse the downlink control information.

In a possible implementation, that the terminal device determines a HARQ process number of each of the L TBs includes: The terminal device uses a $b_0$ bit as a start bit, determines that a $b_i$ bit is a first bit, whose bit state is 1, in the (N+2) bits, where a HARQ process number of a first TB is i, and the terminal device determines, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs; or the terminal device uses a $b_{L+1}$ bit as a start bit, determines that a $b_i$ bit is a first bit, whose bit state is 1, in the (N+2) bits, where a HARQ process number of a first TB is i−L−1, and the terminal device determines, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs. The terminal device may determine that the $b_i$ bit is an $(i+1)^{th}$ bit in the first field. After j and N are obtained, a value of L may be obtained according to the following equation: j=N+1−L, so that the terminal device can determine the quantity of TBs scheduled by using the downlink control information. Alternatively, the terminal device may determine that the $b_i$ bit is an $(i+1)^{th}$ bit in the first field. After j and N are obtained, a value of L may be obtained according to the following equation: j=N+1−L, so that the terminal device can determine the quantity of TBs scheduled by using the downlink control information.

In a possible implementation, the method further includes: The terminal device uses a $b_0$ bit as a start bit, and determines that a $b_m$ bit is a second bit, whose bit state is 1, in the (N+2) bits, where j=m, and L=N+1−m; or the terminal device uses a $b_{N+1}$ bit as a start bit, and determines that a $b_m$ bit is a second bit, whose bit state is 1, from right to left in the (N+2) bits, where j=N+1−m, and L=m. The network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information. Alternatively, the network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information.

In a possible implementation, the NDI information of each of the L TBs is determined by using a bitmap based on L bits, namely, $b_{j+1}$, $b_{j+2}$, . . . , and $b_{N+1}$; or the NDI information of each of the L TBs is determined by using a bitmap based on L bits, namely, $b_0$, $b_1$, . . . , and $b_{L-1}$. For example, L bits are used to indicate, by using a bitmap, acknowledgment information of each of the L TBs scheduled by using the DCI. For example, bit locations of the L bits in the first field are $b_{j+1}$, . . . , and $b_{N+1}$. For example, $b_{j+1}$, . . . , and $b_{N+1}$ are L NDI bits. Each NDI bit in $b_{j+1}$, . . . , and $b_{N+1}$ is associated with each of the L TBs. For example, $b_{j+1}$, . . . , and $b_{N+1}$ are L ACK/NACK indicator bits. Each ACK/NACK bit in $b_{j+1}$, . . . , and $b_{N+1}$ is associated with each of the L TBs. NDI information of each of the L TBs may be flexibly indicated by using a bitmap.

In a possible implementation, the method further includes: The terminal device determines, based on a first bit in the downlink control information, whether the downlink control information includes the first field, where the first bit is one bit. When a bit state of the first bit is 1, the terminal device determines that the downlink control information includes the first field, where N is a positive integer greater than 1. The downlink control information may further include one first bit, and a bit state of the first bit is 1, which may be used to indicate that the downlink control information can schedule both the newly transmitted TB and the retransmitted TB, that is, both the newly transmitted TB and the retransmitted TB can be scheduled in the L TBs. The terminal device parses the first bit in the downlink control information, to determine a TB type that can be scheduled by the network device.

In a possible implementation, the method further includes: The terminal device determines, based on a first bit in the downlink control information, whether the downlink control information includes the first field, where the first bit is one bit; when a bit state of the first bit is 0, the terminal device determines that the downlink control information does not include the first field; the terminal device determines that the downlink control information includes a second bit, where the second bit is one bit; when a bit state of the second bit is 1, the terminal device determines that the downlink control information can be used to schedule a maximum of N TBs, where N is a positive integer greater than 1, and all TBs scheduled by using the downlink control information are newly transmitted TBs, or all TBs scheduled by using the downlink control information are retransmitted TBs; or when a bit state of the second bit is 0, the terminal device determines that the downlink control information can be used to schedule only one TB. The downlink control information may further include one first bit. If a bit state of the first bit is 0, it may indicate that TBs that can be scheduled by using the downlink control information can be only all newly transmitted TBs or only all retransmitted TBs. In this case, the downlink control information does not include the first field. The terminal device parses the first bit in the downlink control information, to determine a TB type that can be scheduled by the network device. The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, the network device sets the bit state of the second bit in the downlink control information to 0. The terminal device parses the first bit in the downlink control information, to determine a TB type that can be scheduled by the network device.

In a possible implementation, the method further includes: The terminal device determines, based on a first bit in the downlink control information, whether the downlink control information includes the first field, where the first bit is one bit; when a bit state of the first bit is 0, the terminal device determines that the downlink control information does not include the first field; the terminal device determines that the downlink control information includes a second bit, where the second bit is one bit; when a bit state of the second bit is 1, the terminal device determines that the downlink control information can be used to schedule the maximum of N TBs, where N is a positive integer greater than 1, and all TBs scheduled by using the downlink control information are newly transmitted TBs, or all TBs scheduled by using the downlink control information are retransmitted TBs; when a bit state of the second bit is 0, the terminal device determines that the downlink control information further includes a third bit, where the third bit is one bit, and a bit state of the third bit is fixed at 1; or the terminal device determines, based on the third bit, that the downlink control information can be used to schedule only one TB. The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, in addition to the first bit and the second bit, the downlink control information further includes a third bit, where the third bit is one bit, and the network device sets a bit state of the third bit to 0. The terminal device parses the first bit in the downlink control information, to determine a TB type that can be scheduled by the network device.

According to a second aspect, an embodiment of this application provides an information processing method, including: A network device determines a quantity L of transport blocks (TBs) scheduled by using downlink control information, where the downlink control information can be used to schedule a maximum of N TBs, N is a positive integer, L is a positive integer, and $1 \leq L \leq N$. The network device determines HARQ process numbers of the L TBs. The network device determines new data indicator (NDI) information of the L TBs. The network device sends the downlink control information to a terminal device, where the downlink control information can be used to schedule both a newly transmitted TB and a retransmitted TB, the downlink control information includes a first field, and the first field includes (N+2) bits, namely, $b_0, b_1, \ldots,$ and $b_{N+1}$. In j consecutive bits, namely, $b_k, b_{k+1}, \ldots,$ and $b_{k+j-1}$ in the first field, a state of only one bit is 1, states of other j−1 bits are all 0, j is a positive integer, j=N+1−L, k is a predefined integer, and k=0 or k=L+1. k=0, a bit state of a $b_j$ bit in the first field is 1, and L consecutive bits, namely, $b_{j+1}, b_{j+2}, \ldots,$ and $b_{N+1}$ in the first field, carry the NDI information of the L TBs scheduled by using the downlink control information; or k=L+1, a bit state of a $b_L$ bit in the first field is 1, and L consecutive bits, namely, $b_0, b_1, \ldots,$ and $b_{L-1}$ in the first field, carry the NDI information of the L TBs scheduled by using the downlink control information. The network device sends or receives the L TBs based on the downlink control information. In this embodiment, only the (N+2) bits are required to support scheduling of any quantity of TBs in the N TBs by using the downlink control information, and HARQ process numbers and NDI information of the transport blocks can be flexibly indicated. This reduces indication overheads of the downlink control information, and further improves scheduling flexibility.

In a possible implementation, the method further includes: The network device determines one or more bit states of the first field according to a correspondence between a bit state of the first field, and L, a HARQ process number of a first TB in the L TBs, and the NDI information of each of the L TBs, where the first TB is one of the L TBs. The network device may preconfigure the correspondence between the bit state of the first field, and L, the HARQ process number of the first TB in the L TBs, and the NDI information of each of the L TBs. L, the HARQ process number of the first TB in the L TBs, and the NDI information of each of the L TBs that are corresponding to the bit state of the first field are configured in the correspondence. Therefore, L, the HARQ process number of the first TB in the L TBs, and the NDI information of each of the L TBs can be quickly determined by querying the correspondence between the bit state of the first field, and L, the HARQ process number of the first TB in the L TBs, and the NDI information of each of the L TBs, to improve efficiency of generating the downlink control information by the network device.

In a possible implementation, the method further includes: When k=0, the network device determines that the HARQ process number of the first TB is i, where the first TB is one TB that comes first in the L TBs, and $0 \leq i \leq j-1$, the network device uses a $b_0$ bit as a start bit, and the network device determines that a bit state of a $b_i$ bit in the first field is 1 and bit states of other j−1 bits other than the $b_i$ bit in $b_0$, $b_1, \ldots,$ and $b_{j-1}$ are all 0; or when k=L+1, the network device determines that the HARQ process number of the first TB is i−L−1, where the first TB is one TB that comes first in the L TBs, and $L+1 \leq i \leq N+1$, the network device uses a $b_{L+1}$ bit as a start bit, the network device determines that a bit state of a $b_i$ bit in the first field is 1, and the network device determines that bit states of other j−1 bits other than the $b_i$ bit in $b_{L+1}, b_{L+2}, \ldots,$ and $b_{N+1}$ are all 0. The network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information. Alternatively, the network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information.

In a possible implementation, the method further includes: When k=0, the network device determines that a bit state of a $b_{N+1-L}$ bit in the first field is 1; or when k=L+1, the network device determines that a bit state of a $b_L$ bit in the first field is 1. k=0, and it is determined that the bit state of the $b_{N+1-L}$ bit in the first field is 1. In the j consecutive bits, namely, $b_k, b_{k+1}, \ldots,$ and $b_{k+j-1}$ in the first field, a state of only one bit is 1, and states of other j−1 bits are all 0. Therefore, it may be determined that the $b_{N+1-L}$ bit is a bit, whose bit state is 1, in the j consecutive bits, namely, $b_k$, $b_{k+1}, \ldots,$ and $b_{k+j-1}$. When k=L+1, the bit state of the $b_L$ bit in the first field is determined to be 1. In the j consecutive bits, namely, $b_k, b_{k+1}, \ldots,$ and $b_{k+j-1}$ in the first field, a state of only one bit is 1, and states of other j−1 bits are all 0. Therefore, it may be determined that the $b_L$ bit is a bit, whose bit state is 1, in the j consecutive bits, namely, $b_k$, $b_{k+1}, \ldots,$ and $b_{k+j-1}$.

In a possible implementation, the method further includes: The network device indicates the NDI information of each of the L TBs by using L bits and a bitmap, where the L bits are $b_{j+1}, b_{j+2}, \ldots, b_{N+1}$ in the first field; or the network device indicates the NDI information of each of the L TBs by using L bits and a bitmap, where the L bits are $b_0, b_1, \ldots, b_{L-1}$ in the first field. For example, L bits are used to indicate, by using a bitmap, acknowledgment information of each of the L TBs scheduled by using the DCI. For example, bit locations of the L bits in the first field are $b_{j+1}, \ldots,$ and $b_{N+1}$. For example, $b_{j+1}, \ldots,$ and $b_{N+1}$ are L NDI bits. Each NDI bit in $b_{j+1}, \ldots,$ and $b_{N+1}$ is associated with each of the L TBs. For example, $b_{j+1}, \ldots,$ and $b_{N+1}$ are L ACK/NACK indicator bits. Each ACK/NACK bit in $b_{j+1}, \ldots,$ and $b_{N+1}$ is associated with each of the L TBs. NDI information of each of the L TBs may be flexibly indicated by using a bitmap.

In a possible implementation, the method further includes: When the network device determines that the downlink control information can be used to schedule both the newly transmitted TB and the retransmitted TB, the network device determines that the downlink control information includes the first field, and the network device sets a bit state of a first bit in the downlink control information to 1, where the first bit is one bit. The downlink control information may further include one first bit, and a bit state of the first bit is 1, which may be used to indicate that the downlink control information can schedule both the newly transmitted TB and the retransmitted TB, that is, both the newly transmitted TB and the retransmitted TB can be scheduled in the L TBs. The terminal device parses the first bit in the downlink control information, to determine a TB type that can be scheduled by the network device.

In a possible implementation, the method further includes: When the network device determines that TBs that can be scheduled by using the downlink control information are only all newly transmitted TBs, or when the network device determines that TBs that can be scheduled by using the downlink control information are only all retransmitted TBs, the network device determines that the downlink control information does not include the first field; and the network device sets a bit state of a first bit in the downlink control information to 0, where the first bit is one bit. The downlink control information may further include one first bit. If a bit state of the first bit is 0, it may indicate that TBs that can be scheduled by using the downlink control information can be only all newly transmitted TBs or only all retransmitted TBs. In this case, the downlink control information does not include the first field. The terminal device parses the first bit in the downlink control information, to determine a TB type that can be scheduled by the network device.

In a possible implementation, the method further includes: When the downlink control information is used to schedule a plurality of newly transmitted TBs, or when the downlink control information is used to schedule a plurality of retransmitted TBs, the network device sets a bit state of a second bit in the downlink control information to 1; or when the downlink control information can be used to schedule only one TB, the network device sets a bit state of a second bit in the downlink control information to 0, where the second bit is one bit. The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, the network device sets the bit state of the second bit in the downlink control information to 0. The terminal device parses the first bit in the downlink control information, to determine a TB type that can be scheduled by the network device.

In a possible implementation, the method further includes: When the downlink control information is used to schedule a plurality of newly transmitted TBs, or when the downlink control information is used to schedule a plurality of retransmitted TBs, the network device sets a bit state of a second bit in the downlink control information to 1, where the second bit is one bit; or when the downlink control information can be used to schedule only one TB, the network device determines that the downlink control information further includes a third bit, where the third bit is one bit, and the network device sets a bit state of the third bit to 0. The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, in addition to the first bit and the second bit, the downlink control information further includes a third bit, where the third bit is one bit, and the network device sets a bit state of the third bit to 0. The terminal device parses the first bit in the downlink control information, to determine a TB type that can be scheduled by the network device.

According to a third aspect, an embodiment of this application provides a terminal device. The terminal device includes a processing module and a transceiver module. The transceiver module is configured to receive downlink control information from a network device, where the downlink control information can be used to schedule a maximum of N transport blocks (TBs), and N is a positive integer. When the processing module is configured to determine that the downlink control information includes a first field, the first field includes (N+2) bits, namely, $b_0, b_1, \ldots,$ and $b_{N+1}$. A quantity L of TBs scheduled by using the downlink control information is determined based on the first field, where L is a positive integer, and $1 \leq L \leq N$. When L is greater than 1, the L TBs scheduled by using the downlink control information can include both a newly transmitted TB and a retransmitted TB. In j consecutive bits, namely, $b_k, b_{k+1}, \ldots,$ and $b_{k+j-1}$ in the first field, a bit state of only one bit is 1, bit states of other j−1 bits are all 0, j is a positive integer, j=N+1−L, k is a predefined integer, and k=0 or k=L+1. k=0, a bit state of a $b_j$ bit in the first field is 1, and L consecutive bits, namely, $b_{j+1}, b_{j+2}, \ldots,$ and $b_{N+1}$ in the first field, carry new data indicator (NDI) information of the L TBs scheduled by using the downlink control information; or k=L+1, a bit state of a $b_L$ bit in the first field is 1, and L consecutive bits, namely, $b_0, b_1, \ldots,$ and $b_{L-1}$ in the first field, carry NDI information of the L TBs scheduled by using the downlink control information. The processing module is configured to determine a HARQ process number of each of the L TBs. The transceiver module is configured to send or receive the L TBs based on the determined HARQ process number of each of the L TBs and the NDI information of each of the L TBs.

In a possible implementation, L, a HARQ process number of a first TB in the L TBs, and the NDI information of each of the L TBs are determined according to a correspondence between a bit state of the first field, and a quantity of TBs, the HARQ process number of the first TB, and the NDI information of the L TBs, and the first TB is one of the L TBs.

In a possible implementation, the processing module is configured to: use a $b_0$ bit as a start bit, determine that a $b_i$ bit is a first bit, whose bit state is 1, in the (N+2) bits, where a HARQ process number of a first TB is i, and determine, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs; or use a $b_{L+1}$ bit as a start bit, determine that a $b_i$ bit is a first bit, whose bit state is 1, in the (N+2) bits, where a HARQ process number of a first TB is i−L−1, and determine, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs.

In a possible implementation, the processing module is configured to: use a $b_0$ bit as a start bit, and determine that a $b_m$ bit is a second bit, whose bit state is 1, in the (N+2) bits, where j=m, and L=N+1−m; or the processing module is configured to: use a $b_{N+1}$ bit as a start bit, and determine that a $b_m$ bit is a second bit, whose bit state is 1, from right to left in the (N+2) bits, where j=N+1−m, and L=m.

In a possible implementation, the NDI information of each of the L TBs is determined by using a bitmap based on L bits, namely, $b_{j+1}$, $b_{j+2}$, . . . , and $b_{N+1}$; or the NDI information of each of the L TBs is determined by using a bitmap based on L bits, namely, $b_0$, $b_1$, . . . , and $b_{L-1}$.

In a possible implementation, the processing module is configured to: determine, based on a first bit in the downlink control information, whether the downlink control information includes the first field, where the first bit is one bit; and when a bit state of the first bit is 1, determine that the downlink control information includes the first field, where N is a positive integer greater than 1.

In a possible implementation, the processing module is configured to: determine, based on a first bit in the downlink control information, whether the downlink control information includes the first field, where the first bit is one bit; when a bit state of the first bit is 0, determine that the downlink control information does not include the first field; determine that the downlink control information includes a second bit, where the second bit is one bit; when a bit state of the second bit is 1, determine that the downlink control information can be used to schedule a maximum of N TBs, where N is a positive integer greater than 1, and all TBs scheduled by using the downlink control information are newly transmitted TBs, or all TBs scheduled by using the downlink control information are retransmitted TBs; or when a bit state of the second bit is 0, determine that the downlink control information can be used to schedule only one TB.

In a possible implementation, the processing module is configured to: determine, based on a first bit in the downlink control information, whether the downlink control information includes the first field, where the first bit is one bit; when a bit state of the first bit is 0, determine that the downlink control information does not include the first field; determine that the downlink control information includes a second bit, where the second bit is one bit; when a bit state of the second bit is 1, determine that the downlink control information can be used to schedule the maximum of N TBs, where N is a positive integer greater than 1, and all TBs scheduled by using the downlink control information are newly transmitted TBs, or all TBs scheduled by using the downlink control information are retransmitted TBs; when a bit state of the second bit is 0, determine that the downlink control information further includes a third bit, where the third bit is one bit, and a bit state of the third bit is fixed at 1; or determine, based on the third bit, that the downlink control information can be used to schedule only one TB.

In the third aspect of this application, composition modules of the terminal device may further perform the steps described in the first aspect and the possible implementations. For details, refer to the description in the first aspect and the possible implementations.

According to a fourth aspect, an embodiment of this application provides a network device, including a processing module and a transceiver module. The processing module is configured to determine a quantity L of transport blocks (TBs) scheduled by using downlink control information, where the downlink control information can be used to schedule a maximum of N TBs, N is a positive integer, L is a positive integer, and 1≤L≤N. The processing module is configured to determine HARQ process numbers of the L TBs. The processing module is configured to determine new data indicator (NDI) information of the L TBs. The transceiver module is configured to send the downlink control information to a terminal device, where the downlink control information can be used to schedule both a newly transmitted TB and a retransmitted TB, the downlink control information includes a first field, and the first field includes (N+2) bits, namely, $b_0$, $b_1$, . . . , and $b_{N+1}$. In j consecutive bits, namely, $b_k$, $b_{k+1}$, . . . , and $b_{k+j-1}$ in the first field, a state of only one bit is 1, states of other j−1 bits are all 0, j is a positive integer, j=N+1−L, k is a predefined integer, and k=0 or k=L+1. k=0, a bit state of a $b_j$ bit in the first field is 1, and L consecutive bits, namely, $b_{j+1}$, $b_{j+2}$, . . . , and $b_{N+1}$ in the first field, carry the NDI information of the L TBs scheduled by using the downlink control information; or k=L+1, a bit state of a $b_L$ bit in the first field is 1, and L consecutive bits, namely, $b_0$, $b_1$, . . . , and $b_{L-1}$ in the first field, carry the NDI information of the L TBs scheduled by using the downlink control information. The transceiver module is configured to send or receive the L TBs based on the downlink control information.

In a possible implementation, the processing module is configured to determine one or more bit states of the first field according to a correspondence between a bit state of the first field, and L, a HARQ process number of a first TB in the L TBs, and the NDI information of each of the L TBs, where the first TB is one of the L TBs.

In a possible implementation, the processing module is configured to: when k=0, determine that the HARQ process number of the first TB is i, where the first TB is one TB that comes first in the L TBs, and 0≤i≤j−1, use a $b_0$ bit as a start bit, and determine that a bit state of a $b_i$ bit in the first field is 1 and bit states of other j−1 bits other than the $b_i$ bit in $b_0$, $b_1$, . . . , and $b_{j-1}$ are all 0; or when k=L+1, determine that the HARQ process number of the first TB is i−L−1, where the first TB is one TB that comes first in the L TBs, and L+1≤i≤N+1, use a $b_{L+1}$ bit as a start bit, determine that a bit state of a $b_i$ bit in the first field is 1, and determine that bit states of other j−1 bits other than the $b_i$ bit in $b_{L+1}$, $b_{L+2}$, . . . , and $b_{N+1}$ are all 0.

In a possible implementation, the processing module is configured to: when k=0, determine that a bit state of a $b_{N+1-L}$ bit in the first field is 1; or when k=L+1, determine that a bit state of a $b_L$ bit in the first field is 1.

In a possible implementation, the processing module is configured to: indicate the NDI information of each of the L TBs by using L bits and a bitmap, where the L bits are $b_{j+1}$, $b_{j+2}$, . . . , $b_{N+1}$ in the first field; or indicate the NDI information of each of the L TBs by using L bits and a bitmap, where the L bits are $b_0$, $b_1$, . . . , $b_{L-1}$ in the first field.

In a possible implementation, the processing module is configured to: when determining that the downlink control information can be used to schedule both the newly transmitted TB and the retransmitted TB, determine that the downlink control information includes the first field, and set a bit state of a first bit in the downlink control information to 1, where the first bit is one bit.

In a possible implementation, the processing module is configured to: when determining that TBs that can be scheduled by using the downlink control information are only all newly transmitted TBs, or when determining that TBs that can be scheduled by using the downlink control information are only all retransmitted TBs, determine that the downlink control information does not include the first field; and set a bit state of a first bit in the downlink control information to 0, where the first bit is one bit.

In a possible implementation, the processing module is configured to: when the downlink control information is used to schedule a plurality of newly transmitted TBs, or when the downlink control information is used to schedule a plurality of retransmitted TBs, set a bit state of a second bit in the downlink control information to 1; or when the downlink control information can be used to schedule only one TB, set a bit state of a second bit in the downlink control information to 0, where the second bit is one bit.

In a possible implementation, the processing module is configured to: when the downlink control information is used to schedule a plurality of newly transmitted TBs, or when the downlink control information is used to schedule a plurality of retransmitted TBs, set a bit state of a second bit in the downlink control information to 1, where the second bit is one bit; or when the downlink control information can be used to schedule only one TB, determine that the downlink control information further includes a third bit, where the third bit is one bit, and set a bit state of the third bit to 0.

In the fourth aspect of this application, the composition modules of the network device may further perform the steps described in the second aspect and the possible implementations. For details, refer to the description in the second aspect and the possible implementations.

According to a fifth aspect, an embodiment of this application provides a computer-readable storage medium. The computer-readable storage medium stores instructions, and when the instructions are run on a computer, the computer is enabled to perform the method according to the first aspect or the second aspect.

According to a sixth aspect, an embodiment of this application provides a computer program product including instructions. When the computer program product runs on a computer, the computer is enabled to perform the method according to the first aspect or the second aspect.

According to a seventh aspect, an embodiment of this application provides a communications device. The communications device may include an entity, for example, a terminal device or a network device. The communications device includes a processor and a memory. The memory is configured to store instructions. The processor is configured to execute the instructions in the memory, to enable the communications device to perform the method according to the first aspect or the second aspect.

According to an eighth aspect, an embodiment of this application provides a chip system. The chip system includes a processor, configured to support a communications device to implement functions in the foregoing aspects, for example, sending or processing data and/or information in the foregoing methods. In a possible design, the chip system further includes a memory. The memory is configured to store program instructions and data that are necessary for the communications device. The chip system may include a chip, or may include a chip and another discrete device.

According to a ninth aspect, an embodiment of this application provides a communications device, including a processor and a communications interface. The communications interface is configured to: receive a signal from another communications device other than the communications device, and transmit the signal to the processor; or send a signal from the processor to another communications device other than the communications device. The processor is configured to implement the method according to any one of the first aspect or the second aspect by using a logic circuit or by executing code instructions.

BRIEF DESCRIPTION OF DRAWINGS

FIG. 4a is a schematic diagram in which 10 bits included in a first field are used to indicate a quantity L of TBs scheduled by using DCI, a HARQ process number of a first TB, and feedback information of each of the L TBs according to an embodiment of this application;

FIG. 4b is a schematic diagram in which 10 bits are used to indicate a quantity L of TBs scheduled by using DCI, a HARQ process number of a first TB, and feedback information of each of the L TBs according to an embodiment of this application;

FIG. 6 is a schematic diagram in which 10 bits included in a first field are used to indicate a quantity L of TBs scheduled by using DCI, a HARQ process number of a first TB, and feedback information of each of the L TBs according to an embodiment of this application;

DESCRIPTION OF EMBODIMENTS

Figure 1:
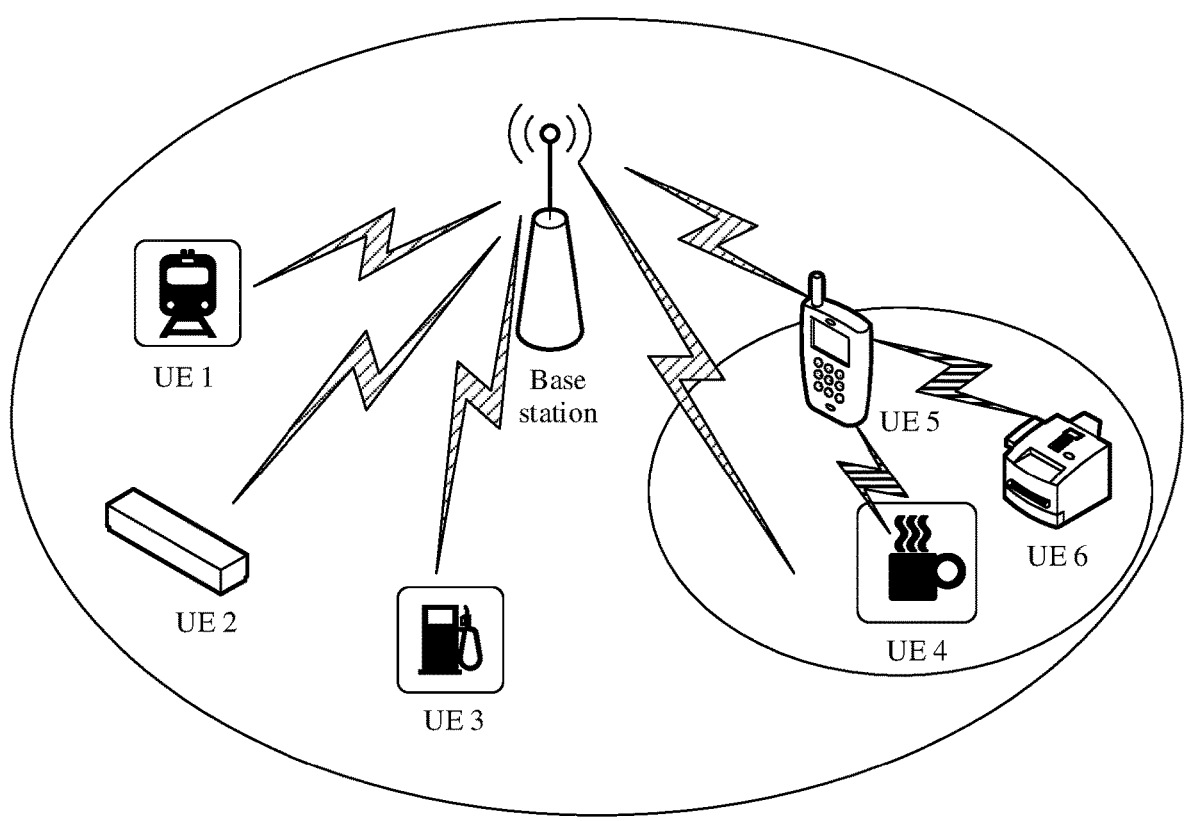
FIG. 1 is a schematic diagram of a system architecture of an information processing method according to an embodiment of this application.

Embodiments of this application provide an information processing method, a terminal device, and a network device, to reduce indication overheads of downlink control information and improve scheduling flexibility.

The following describes embodiments of this application with reference to the accompanying drawings.

In the specification, claims, and the accompanying drawings of this application, the terms "first", "second", and the like are intended to distinguish between similar objects but do not necessarily indicate a specific order or sequence. It should be understood that such terms are interchangeable in proper circumstances, and this is merely a distinguishing manner used to describe objects with a same attribute in embodiments of this application. In addition, terms "include", "have", and any other variations thereof are intended to cover a non-exclusive inclusion, so that a process, method, system, product, or device that includes a series of units is not limited to those units, but may include other units not expressly listed or inherent to such a process, method, product, or device.

The technical solutions in embodiments of this application may be applied to various communications systems for data processing, for example, a code division multiple access (CDMA) system, a time division multiple access (TDMA) system, a frequency division multiple access (FDMA) system, an orthogonal frequency division multiple access (OFDMA) system, a single-carrier frequency division multiple access (single-carrier FDMA, SC-FDMA) system, and another system. Terms "system" and "network" are interchangeable. The CDMA system may implement wireless technologies such as universal terrestrial radio access (UTRA) and CDMA2000. The UTRA may include a wideband CDMA (WCDMA) technology and another variant technology of CDMA. CDMA2000 may cover the interim standard (IS) 2000 (IS-2000), the IS-95 standard, and the IS-856 standard. The TDMA system may implement wireless technologies such as a global system for mobile communications (GSM). The OFDMA system may implement wireless technologies such as evolved universal terrestrial radio access (evolved UTRA, E-UTRA), ultra mobile broadband (UMB), IEEE 802.11 (Wi-Fi), IEEE 802.16 (WiMAX), IEEE 802.20, and Flash OFDMA. The UTRA corresponds to a UMTS, and the E-UTRA corresponds to an evolved version of the UMTS. A new version of the UMTS that uses the E-UTRA is used in long term evolution (LTE) and various versions evolved based on LTE in 3GPP. A 5th generation ("5G" for short) communications system, new radio ("NR" for short), and a future 6th generation (6G) mobile communications system are next generation communications systems under research. The technical solutions in embodiments of this application may be applied to various communications systems such as V2X, LTE-V, V2V, the Internet of Vehicles, MTC, the IoT, LTE-M, and M2M. In addition, the communications system is further applicable to a future-oriented communications technology, and is applicable to the technical solutions provided in embodiments of this application. A system architecture and a service scenario described in embodiments of this application are intended to describe the technical solutions in embodiments of this application more clearly, and do not constitute a limitation on the technical solutions provided in embodiments of this application. A person of ordinary skill in the art may know that with evolution of a network architecture and emergence of a new service scenario, the technical solutions provided in embodiments of this application are also applicable to similar technical problems.

The communications system provided in embodiments of this application may include a first communications device and a second communications device, and data transmission may be performed between the first communications device and the second communications device. For example, the first communications device may include a terminal device, and the second communications device may include a network device. Alternatively, the first communications device may include one terminal device, and the second communications device may include another terminal device. Alternatively, the first communications device may include one network device, and the second communications device may include another network device.

FIG. 1 is a schematic diagram of a structure of a possible radio access network (RAN) according to an embodiment of this application. The RAN may be a base station access system in a 2G network (to be specific, the RAN includes a base station and a base station controller), a base station access system in a 3G network (to be specific, the RAN includes a base station and an RNC), a base station access system in a 4G network (to be specific, the RAN includes an eNB and an RNC), or a base station access system in a 5G network.

The RAN includes one or more network devices. The network device may be any device having a wireless transceiver function, or a chip disposed in a device having a wireless transceiver function. The network device includes but is not limited to a base station (for example, a base station (BS), a NodeB, an evolved NodeB (eNodeB or eNB), a gNodeB or a gNB in a 5th generation (5G) communications system, a base station in a future communications system, an access node in a Wi-Fi system, a wireless relay node, or a wireless backhaul node) and the like. The base station may be a macro base station, a micro base station, a picocell base station, a small cell, a relay station, or the like. A plurality of base stations may support a network using the foregoing one or more technologies, or a future evolved network. A core network may support a network using the foregoing one or more technologies, or a future evolved network. The base station may include one or more co-site or non-co-site transmission reception points (TRPs). The network device may alternatively be a radio controller, a centralized unit (CU), a distributed unit (DU), or the like in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with terminal devices 1 to 6 (e.g., UE 1 to 6), or may communicate with the terminal devices 1 to 6 through a relay station. The terminal devices 1 to 6 (or UE 1 to 6) may support communication with a plurality of base stations using different technologies. For example, the terminal devices may support communication with a base station supporting an LTE network, may support communication with a base station supporting the 5G network, or may support a dual connection to a base station in an LTE network and a base station in the 5G network. For example, the terminals are connected to a RAN node of a wireless network. Currently, for example, the RAN node is a gNB, a transmission reception point (TRP), an evolved NodeB (eNB), a radio network controller (RNC), a NodeB (NB), a base station controller (BSC), a base transceiver station (BTS), a home NodeB (for example, a home evolved NodeB or aHNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

The terminal devices 1 to 6 (or UE 1 to 6) each are also referred to as user equipment (UE), a mobile station (MS), a mobile terminal (MT), a terminal, or the like, and are devices that provide voice and/or data connectivity for a user, or are chips disposed in the devices, for example, a handheld device or a vehicle-mounted device having a wireless connection function. Currently, for example, the terminal device is a mobile phone, a tablet computer, a notebook computer, a palmtop computer, a mobile Internet device (MID), a wearable device, a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, or a wireless terminal in a smart home. The terminal device provided in embodiments of this application may be a low-complexity terminal device and/or a terminal device in a coverage enhancement mode A.

In embodiments of this application, the base station and UE 1 to UE 6 form a communications system, and in the communications system, the base station sends one or more of system information, a RAR message, and a paging message to one or more of the UE 1 to the UE 6. In addition, the UE 4 to the UE 6 also form a communications system, and in the communications system, the UE 5 may function as a base station, and the UE 5 may send one or more of system information, control information, and a paging message to one or more of the UE 4 and the UE 6.

In this application, transmission may be sending or receiving. When one side of the communication performs sending, a peer device of the communication performs receiving. A TB may be a TB for uplink transmission, or may be a TB for downlink transmission.

A resource in this embodiment may be a symbol, a slot, a short slot, a subframe, or the like. A resource in this embodiment may alternatively be a subcarrier, a resource block, a carrier, a channel control element, or the like.

When the resource in this embodiment is a symbol, a time unit may be a slot, a short slot, or a subframe. When the resource in this embodiment is a subcarrier, a time unit is a resource block, a carrier, a channel control element, or the like.

Figure 2:
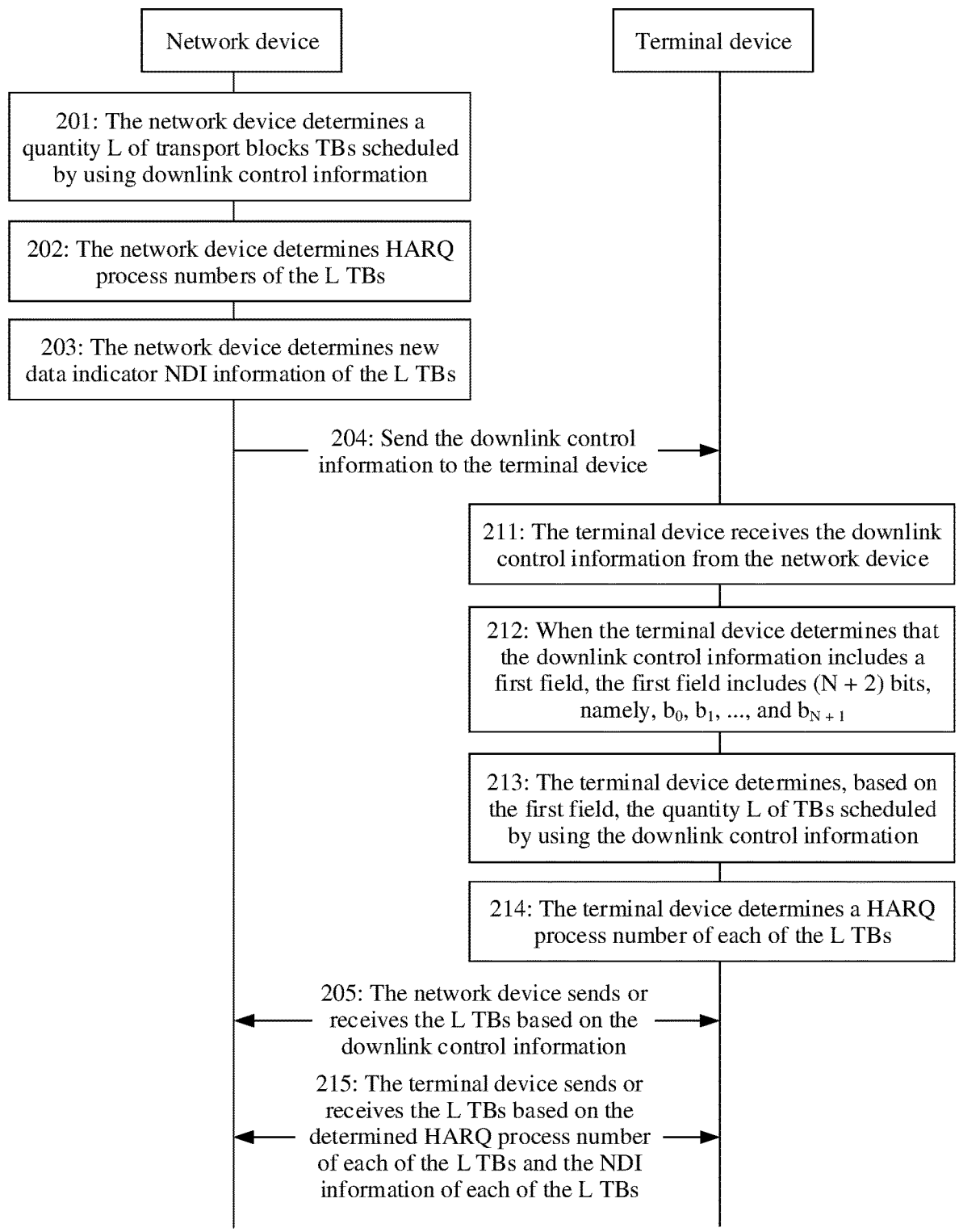
FIG. 2 is a schematic interaction flowchart of an information processing method according to an embodiment of this application.

FIG. 2 is a schematic interaction flowchart of an information processing method according to an embodiment of this application. The following step 201 to step 205 are described from a perspective of a network device, and the following step 211 to step 215 are described from a perspective of a terminal device. The following steps are mainly included.

201: The network device determines a quantity L of transport blocks (TBs) scheduled by using downlink control information, where the downlink control information can be used to schedule a maximum of N TBs, N is a positive integer, L is a positive integer, and $1 \leq L \leq N$.

The downlink control information may be used to schedule one or more TBs. For example, the quantity of TBs scheduled by using the downlink control information is represented by a letter L. The downlink control information can schedule the maximum of N TBs, where N is a positive integer, L is a positive integer, and $1 \leq L \leq N$. A specific value of L is not limited herein.

The quantity L of transport blocks (TBs) scheduled by using the downlink control information may also be a quantity L of hybrid automatic repeat request (HARQ) processes indicated by using the downlink control information. In other words, the quantity of TBs and the quantity of HARQ processes are in a one-to-one correspondence.

202: The network device determines HARQ process numbers of the L TBs.

In this embodiment, when the network device determines that the quantity of TBs scheduled by using the downlink control information is L, the network device further needs to determine the HARQ process numbers of the L TBs, for example, determine a HARQ process number of each of the L TBs. The HARQ process number may also be referred to as a HARQ process index.

203: The network device determines new data indicator (NDI) information of the L TBs.

In this embodiment, when the network device determines that the quantity of TBs scheduled by using the downlink control information is L, the network device further needs to determine the NDI information of the L TBs. For example, the network device needs to determine NDI information of each of the L TBs. For example, the NDI information is carried in the downlink control information.

It should be noted that the NDI information is used to indicate whether data transmission scheduled by using the downlink control information carries a newly transmitted TB or a retransmitted TB. For example, the NDI information may include feedback information of each of the L TBs, and the feedback information of the TB may also be referred to as TB acknowledgment information.

Step 202 and step 203 are not subject to a specific sequence. For example, the network device may first perform any one of step 202 and step 203, or may concurrently perform step 202 and step 203. This is not limited herein.

204: The network device sends the downlink control information to the terminal device, where the downlink control information can be used to schedule both a newly transmitted TB and a retransmitted TB, the downlink control information includes a first field, and the first field includes (N+2) bits, namely, $b_0, b_1, \ldots,$ and $b_{N+1}$.

In j consecutive bits, namely, $b_k, b_{k+1}, \ldots,$ and $b_{k+j-1}$ in the first field, a state of only one bit is 1, states of other j−1 bits are all 0, j is a positive integer, j=N+1−L, k is a predefined integer, and k=0 or k=L+1.

k=0, a bit state of a $b_j$ bit in the first field is 1, and L consecutive bits, namely, $b_{j+1}, b_{j+2}, \ldots,$ and $b_{N+1}$ in the first field, carry NDI information of the L TBs scheduled by using the downlink control information; or k=L+1, a bit state of a $b_L$ bit in the first field is 1, and L consecutive bits, namely, $b_0, b_1, \ldots,$ and $b_{L-1}$ in the first field, carry NDI information of the L TBs scheduled by using the downlink control information.

In this embodiment, the downlink control information can be used to schedule both the newly transmitted TB and the retransmitted TB. "Can" refers to a capability of the network device to schedule different TB types (for example, the newly transmitted TB and the retransmitted TB) by using the downlink control information. The downlink control information can be used to schedule both the newly transmitted TB and the retransmitted TB. However, the network device may determine, based on a TB type that needs to be fed back, a TB type actually scheduled by using the downlink control information. The downlink control information can be used to schedule both the newly transmitted TB and the retransmitted TB, the downlink control information includes a first field, and the first field includes (N+2) bits. The (N+2) bits are: $b_0, b_1, \ldots,$ and $b_{N+1}$, where $b_h$ is an $(h+1)^{th}$ bit in the first field, h is an integer, and $0 \leq h \leq N+1$. It can be learned that there is a mapping relationship between a subscript "h" of $b_h$ in the first field and a location of $b_h$ in the first field (the $(h+1)^{th}$ bit).

In this embodiment, in j consecutive bits, namely, $b_k, b_{k+1}, \ldots,$ and $b_{k+j-1}$ in the first field, a state of only one bit is 1, states of other j−1 bits are all 0, j is a positive integer, j=N+1−L, k is a predefined integer, and k=0 or k=L+1.

For the j consecutive bits, namely, $b_k, b_{k+1}, \ldots,$ and $b_{k+j-1}$, a state of only one bit is 1, and states of other j−1 bits are all 0. Specifically, a bit, whose state is 1, in the j consecutive bits, namely, $b_k, b_{k+1}, \ldots,$ and $b_{k+j-1}$, is determined based on an actual scenario. This is not limited herein. This embodiment is also applicable to a case in which in j consecutive bits, namely, $b_k, b_{k+1}, \ldots,$ and $b_{k+j-1}$ in the first field, a state of only one bit is 0, states of other j−1 bits are all 1. A specific implementation is similar to a specific implementation in the foregoing embodiment. Details are not described herein again.

Figure 3A:
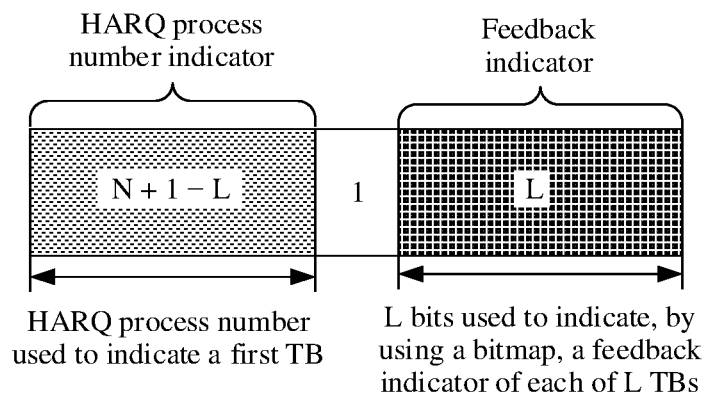
FIG. 3a is a schematic diagram of a composition structure of a first field in downlink control information according to an embodiment of this application.

FIG. 3a is a schematic diagram of a composition structure of a first field in downlink control information according to an embodiment of this application. k=0, a bit state of a $b_j$ bit in the first field is 1, and L consecutive bits, namely, $b_{j+1}, b_{j+2}, \ldots,$ and $b_{N+1}$ in the first field, carry NDI information of the L TBs scheduled by using the downlink control information. In FIG. 3a, a bit counting from right to left whose bit state is 1 is determined.

Figure 3B:
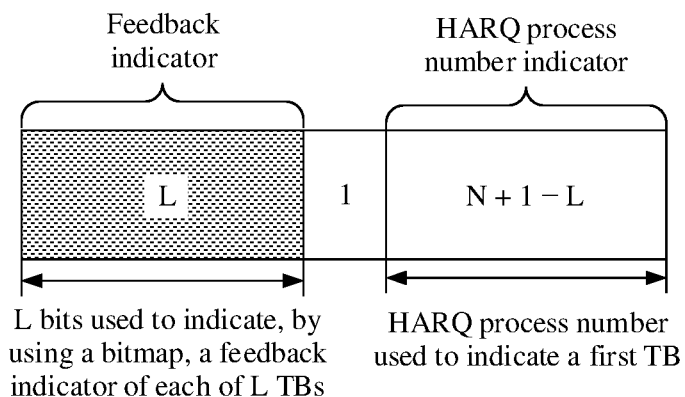
FIG. 3b is a schematic diagram of a composition structure of a first field in downlink control information according to an embodiment of this application.

FIG. 3b is a schematic diagram of a composition structure of a first field in downlink control information according to an embodiment of this application. k=L+1, a bit state of a $b_L$ bit in the first field is 1, and L consecutive bits, namely, $b_0, b_1, \ldots,$ and $b_{L-1}$ in the first field, carry NDI information of the L TBs scheduled by using the downlink control information. In FIG. 3b, a bit counting from right to left whose bit state is 1 is determined.

In an example in this embodiment, if a value of N is 8, only 10 bits are required to support scheduling of any quantity of TBs in eight TBs by using one piece of DCI when HARQ process numbers are consecutive, and HARQ-ACK acknowledgment information of the transport blocks and the HARQ process numbers can be flexibly indicated. In this way, scheduling flexibility is improved, and DCI indication overheads are reduced.

In some embodiments of this application, the information processing method performed by the network device may further include the following steps.

The network device determines one or more bit states of the first field according to a correspondence between a bit state of the first field, and L, a HARQ process number of a first TB in the L TBs, and the NDI information of each of the L TBs, where the first TB is one of the L TBs.

The network device may preconfigure the correspondence between the bit state of the first field, and L, a HARQ process number of the first TB in the L TBs, and the NDI information of each of the L TBs. L, the HARQ process number of the first TB in the L TBs, and the NDI information of each of the L TBs that are corresponding to the bit state of the first field are configured in the correspondence. Therefore, L, the HARQ process number of the first TB in the L TBs, and the NDI information of each of the L TBs can be quickly determined by querying the correspondence between the bit state of the first field, and L, the HARQ process number of the first TB in the L TBs, and the NDI information of each of the L TBs, to improve efficiency of generating the downlink control information by the network device.

In some embodiments of this application, L is determined according to the correspondence between the bit state of the first field and the quantity L of TBs. The HARQ process number of each of the L TBs is determined based on the HARQ process number of the first TB. The HARQ process number of the first TB is determined according to the correspondence between the bit state of the first field and the HARQ process number of the first TB, where the first TB is one of the L TBs. The feedback information of each of the L TBs is determined according to the correspondence between the bit state of the first field and feedback information of L TBs.

The network device may preconfigure the correspondence between the bit state of the first field and the HARQ process number of the first TB. The HARQ process number, of the first TB, corresponding to the bit state of the first field is configured in the correspondence. Therefore, the HARQ process number of the first TB in the L TBs can be quickly determined by querying the correspondence between the bit state of the first field and the HARQ process number of the first TB in the L TBs. HARQ process numbers of all the L TBs are consecutive. In this way, efficiency of generating the downlink control information by the network device is improved by determining a HARQ process number of another TB by using the HARQ process number of the first TB.

In some embodiments of this application, the information processing method performed by the network device may further include the following steps.

When k=0, the network device determines that the HARQ process number of the first TB is i, where the first TB is one TB that comes first in the L TBs, and 0≤i≤j−1, the network device uses a $b_0$ bit as a start bit, and the network device determines that a bit state of a $b_i$ bit in the first field is 1 and bit states of other j−1 bits other than the $b_i$ bit in $b_0, b_1, \ldots,$ and $b_{j-1}$ are all 0; or when k=L+1, the network device determines that the HARQ process number of the first TB is i−L−1, where the first TB is one TB that comes first in the L TBs, and L+1≤i≤N+1, the network device uses a $b_{L+1}$ bit as a start bit, the network device determines that a bit state of a $b_i$ bit in the first field is 1, and the network device determines that bit states of other j−1 bits other than the $b_i$ bit in $b_{L+1}, b_{L+2}, \ldots,$ and $b_{N+1}$ are all 0.

As shown in FIG. 3a, the network device determines that the HARQ process number of the first TB is i, where the first TB is one TB that comes first in the L TBs, and 0≤i≤j−1, the network device uses the $b_0$ bit as the start bit, and the network device determines that the bit state of the $b_i$ bit in the first field is 1 and the bit states of the other j−1 bits other than the $b_i$ bit in $b_0, b_1, \ldots,$ and $b_{j-1}$ are all 0. Because the bit state of the $b_i$ bit in the first field is 1 and the bit states of the other j−1 bits are all 0, the network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information.

As shown in FIG. 3b, the network device determines that the HARQ process number of the first TB is i−L−1, where the first TB is one TB that comes first in the L TBs, and L+1≤i≤N+1, the network device uses the $b_{L+1}$ bit as the start bit, the network device determines that the bit state of the $b_i$ bit in the first field is 1, and the network device determines that the bit states of the other j−1 bits other than the $b_i$ bit in $b_{L+1}, b_{L+2}, \ldots,$ and $b_{N+1}$ are all 0. The network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information.

In some embodiments of this application, k=0, and the network device determines that a bit state of a $b_{N+1-L}$ bit in the first field is 1; or k=L+1, and the network device determines that the bit state of the $b_L$ bit in the first field is 1.

k=0, and as shown in FIG. 3a, the network device determines that the bit state of the $b_{N+1-L}$ bit in the first field is 1. In the j consecutive bits, namely, $b_k$, $b_{k+1}$, ..., and $b_{k+j-1}$ in the first field, a state of only one bit is 1, and states of other j−1 bits are all 0. Therefore, it may be determined that the $b_{N+1-L}$ bit is a bit, whose bit state is 1, in the j consecutive bits, namely, $b_k$, $b_{k+1}$, ..., and $b_{k+j-1}$.

k=L+1, and as shown in FIG. 3b, the network device determines that the bit state of the $b_L$ bit in the first field is 1. In the j consecutive bits, namely, $b_k$, $b_{k+1}$, ..., and $b_{k+j-1}$ in the first field, a state of only one bit is 1, and states of other j−1 bits are all 0. Therefore, it may be determined that the $b_L$ bit is a bit, whose bit state is 1, in the j consecutive bits, namely, $b_k$, $b_{k+1}$, ..., and $b_{k+j-1}$.

In some embodiments of this application, as shown in FIG. 3a, the network device indicates the NDI information of each of the L TBs by using L bits and a bitmap, where the L bits are $b_{j+1}$, $b_{j+2}$, ..., $b_{N+1}$ in the first field; or as shown in FIG. 3b, the network device indicates the NDI information of each of the L TBs by using L bits and a bitmap, where the L bits are $b_0$, $b_1$, ..., $b_{L-1}$ in the first field.

For example, L bits are used to indicate, by using a bitmap, acknowledgment information of each of the L TBs scheduled by using the DCI. For example, bit locations of the L bits in the first field are $b_{j+1}$, ..., and $b_{N+1}$. For example, $b_{j+1}$, ..., and $b_{N+1}$ are L NDI bits. Each NDI bit in $b_{j+1}$, ..., and $b_{N+1}$ is associated with each of the L TBs. For example, $b_{j+1}$, ..., and $b_{N+1}$ are L ACK/NACK indicator bits. Each ACK/NACK bit in $b_{j+1}$, ..., and $b_{N+1}$ is associated with each of the L TBs. NDI information of each of the L TBs may be flexibly indicated by using a bitmap.

In some embodiments of this application, the information processing method performed by the network device may further include the following steps.

When the network device determines that the downlink control information can be used to schedule both the newly transmitted TB and the retransmitted TB, the network device determines that the downlink control information includes the first field, and the network device sets a bit state of a first bit in the downlink control information to 1, where the first bit is one bit.

The downlink control information may further include one first bit, and a bit state of the first bit is 1, which may be used to indicate that the downlink control information can schedule both the newly transmitted TB and the retransmitted TB, that is, both the newly transmitted TB and the retransmitted TB can be scheduled in the L TBs. The terminal device parses the first bit in the downlink control information, to determine a TB type that can be scheduled by the network device.

In some embodiments of this application, the information processing method performed by the network device may further include the following steps.

When the network device determines that TBs that can be scheduled by using the downlink control information are only all newly transmitted TBs, or when the network device determines that TBs that can be scheduled by using the downlink control information are only all retransmitted TBs, the network device determines that the downlink control information does not include the first field.

The network device sets a bit state of a first bit in the downlink control information to 0, where the first bit is one bit.

The downlink control information may further include one first bit. If a bit state of the first bit is 0, it may indicate that TBs that can be scheduled by using the downlink control information can be only all newly transmitted TBs or only all retransmitted TBs. In this case, the downlink control information does not include the first field. The terminal device parses the first bit in the downlink control information, to determine a TB type that can be scheduled by the network device.

In some embodiments of this application, the information processing method performed by the network device may further include the following steps.

When the downlink control information is used to schedule a plurality of newly transmitted TBs, or when the downlink control information is used to schedule a plurality of retransmitted TBs, the network device sets a bit state of a second bit in the downlink control information to 1.

When the downlink control information can be used to schedule only one TB, the network device sets a bit state of a second bit in the downlink control information to 0, where the second bit is one bit.

The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, the network device sets the bit state of the second bit in the downlink control information to 0. The terminal device parses the first bit in the downlink control information, to determine a TB type that can be scheduled by the network device.

In some embodiments of this application, the information processing method performed by the network device may further include the following steps.

When the downlink control information is used to schedule a plurality of newly transmitted TBs, or when the downlink control information is used to schedule a plurality of retransmitted TBs, the network device sets a bit state of a second bit in the downlink control information to 1, where the second bit is one bit.

When the downlink control information can be used to schedule only one TB, the network device determines that the downlink control information further includes a third bit, where the third bit is one bit, and the network device sets a bit state of the third bit to 0.

The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, in addition to the first bit and the second bit, the downlink control information further includes a third bit, where the third bit is one bit, and the network device sets a bit state of the third bit to 0. The terminal device parses the first bit in the downlink control information, to determine a TB type that can be scheduled by the network device.

In some embodiments of this application, when the bit state of the second bit is 1,
the downlink control information includes N bits, and the N bits are used to indicate, by using a bitmap, whether N HARQ process numbers are used; and/or
the downlink control information includes one NDI bit, or the downlink control information includes one bit used to distinguish whether TBs scheduled by using the downlink control information are all newly transmitted TBs or retransmitted TBs.

The downlink control information may further include one first bit. When a bit state of the first bit is 0, the downlink control information may include one second bit. When the downlink control information schedules a plurality of newly transmitted TBs, or when the downlink control information schedules a plurality of retransmitted TBs, the network device sets the bit state of the second bit in the downlink control information to 1, and the downlink control information includes the N bits. The N bits are used to indicate, by using the bitmap, whether the N HARQ process numbers are used. Therefore, process numbers in the N HARQ process numbers used may be determined, and a TB corresponding to a used HARQ process number is a TB scheduled by using the downlink control information.

In another embodiment, when the bit state of the second bit is 1, the downlink control information includes one NDI bit, or the downlink control information includes one bit used to distinguish whether TBs scheduled by using the downlink control information are all newly transmitted TBs or all retransmitted TBs. Therefore, the terminal device may determine, based on a value of the NDI bit, whether the TBs scheduled by using the downlink control information are all the newly transmitted TBs or the retransmitted TBs.

In some embodiments of this application, the terminal device determines that the downlink control information can be used to schedule only one TB, where the downlink control information further includes M bits, M is a positive integer, and the M bits are used to indicate a HARQ process number of the one TB.

The downlink control information further includes one NDI bit.

If the downlink control information can be used to schedule only the one TB, the downlink control information further includes the M bits, and the M bits are used to indicate the HARQ process number of the one TB, so that the network device can flexibly indicate the HARQ process number of the one TB.

In some embodiments of this application, when N is greater than 1, N=8 or N=4.

N is a maximum quantity of TBs scheduled by using the downlink control information, and N may be a fixed value specified in a standard, or a value configured by a second communications device for a first communications device. For example, a value set of N is {1, 2, 4, 8}; a value set of N is {2, 4, 8}; a value set of N is {1, 4, 8}; or a value set of N is {1, 2, 8}. The network device may specifically determine a value of N based on an actual scenario.

211: The terminal device receives the downlink control information from the network device, where the downlink control information can be used to schedule the maximum of N transport blocks (TBs), and N is a positive integer.

212: When the terminal device determines that the downlink control information includes the first field, the first field includes (N+2) bits, namely, $b_0, b_1, \ldots,$ and $b_{N+1}$.

213: The terminal device determines, based on the first field, the quantity L of TBs scheduled by using the downlink control information, where L is a positive integer, and $1 \leq L \leq N$.

Alternatively, the terminal device determines, based on the first field, a quantity L of hybrid automatic repeat request (HARQ) processes indicated by using the downlink control information.

When L is greater than 1, the L TBs scheduled by using the downlink control information can include both a newly transmitted TB and a retransmitted TB; or the L HARQ processes indicated by using the downlink control information can include both a newly transmitted TB and a retransmitted TB.

In j consecutive bits, namely, $b_k, b_{k+1}, \ldots,$ and $b_{k+j-1}$ in the first field, a bit state of only one bit is 1, bit states of other j−1 bits are all 0, j is a positive integer, j=N+1−L, k is a predefined integer, and k=0 or k=L+1.

k=0, a bit state of a $b_j$ bit in the first field is 1, and L consecutive bits, namely, $b_{j+1}, b_{j+2}, \ldots,$ and $b_{N+1}$ in the first field, carry new data indicator (NDI) information of the L TBs scheduled by using the downlink control information; or k=L+1, a bit state of a $b_L$ bit in the first field is 1, and L consecutive bits, namely, $b_0, b_1, \ldots,$ and $b_{L-1}$ in the first field, carry NDI information of the L TBs scheduled by using the downlink control information.

In some embodiments of this application, L, the HARQ process number of the first TB in the L TBs, and the NDI information of each of the L TBs are determined according to the correspondence between the bit state of the first field, and the quantity of TBs, the HARQ process number of the first TB, and the NDI information of the L TBs, and the first TB is one of the L TBs.

The network device may preconfigure the correspondence between the bit state of the first field, and L, the HARQ process number of the first TB in the L TBs, and the NDI information of each of the L TBs. L, the HARQ process number of the first TB in the L TBs, and the NDI information of each of the L TBs that are corresponding to the bit state of the first field are configured in the correspondence. Therefore, L, the HARQ process number of the first TB in the L TBs, and the NDI information of each of the L TBs can be quickly determined by querying the correspondence between the bit state of the first field, and L, the HARQ process number of the first TB in the L TBs, and the NDI information of each of the L TBs, so that the terminal device can parse the downlink control information.

In some embodiments of this application, that the terminal device determines a HARQ process number of each of the L TBs includes:

The terminal device uses a $b_0$ bit as a start bit, determines that a $b_i$ bit is a first bit, whose bit state is 1, in the (N+2) bits, where a HARQ process number of a first TB is i, and the terminal device determines, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs; or the terminal device uses a $b_{L+1}$ bit as a start bit, determines that a $b_i$ bit is a first bit, whose bit state is 1, in the (N+2) bits, where a HARQ process number of a first TB is i−L−1, and determines, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs.

As shown in FIG. 3a, the terminal device determines that the HARQ process number of the first TB is i, where the first TB is one TB that comes first in the L TBs, and $0 \leq i \leq j-1$, the terminal device uses the $b_0$ bit as the start bit, and the terminal device determines that the bit state of the $b_i$ bit in the first field is 1 and the bit states of the other j−1 bits other than the $b_i$ bit in $b_0, b_1, \ldots,$ and $b_{j-1}$ are all 0. Because the bit state of the $b_i$ bit in the first field is 1 and the bit states of the other j−1 bits are all 0, the terminal device may determine that the $b_i$ bit is an $(i+1)^{th}$ bit in the first field. After j and N are obtained, a value of L may be obtained according to the following equation: j=N+1−L, so that the terminal device can determine the quantity of TBs scheduled by using the downlink control information.

As shown in FIG. 3b, the terminal device determines that the HARQ process number of the first TB is i−L−1, where the first TB is one TB that comes first in the L TBs, and $L+1 \leq i \leq N+1$, the terminal device uses the $b_{L+1}$ bit as the start bit, the terminal device determines that the bit state of the $b_i$ bit in the first field is 1, and the terminal device determines that the bit states of the other j−1 bits other than the $b_i$ bit in $b_{L+1}, b_{L+2}, \ldots,$ and $b_{N+1}$ are all 0. The terminal device may determine that the $b_i$ bit is an $(i+1)^{th}$ bit in the first field. After j and N are obtained, a value of L may be obtained according to the following equation: j=N+1−L, so that the terminal device can determine the quantity of TBs scheduled by using the downlink control information.

In some embodiments of this application, the method performed by the terminal device may further include the following steps.

The terminal device uses a $b_0$ bit as a start bit, and determines that a $b_m$ bit is a second bit, whose bit state is 1, in the (N+2) bits, where j=m, and L=N+1−m: or
the terminal device uses a $b_{N+1}$ bit as a start bit, and determines that a $b_m$ bit is a second bit, whose bit state is 1, from right to left in the (N+2) bits, where j=N+1−m, and L=m.

As shown in FIG. 3a, the terminal device determines that the HARQ process number of the first TB is i, where the first TB is one TB that comes first in the L TBs, and $0 \leq i \leq j-1$, the network device uses the $b_0$ bit as the start bit, and the network device determines that the bit state of the $b_i$ bit in the first field is 1 and the bit states of the other j−1 bits other than the $b_i$ bit in $b_0, b_1, \ldots,$ and $b_{j-1}$ are all 0. Because the bit state of the $b_i$ bit in the first field is 1 and the bit states of the other j−1 bits are all 0, the network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information.

As shown in FIG. 3b, the terminal device determines that the HARQ process number of the first TB is i−L−1, where the first TB is one TB that comes first in the L TBs, and $L+1 \leq i \leq N+1$, the network device uses the $b_{L+1}$ bit as the start bit, the network device determines that the bit state of the $b_i$ bit in the first field is 1, and the network device determines that the bit states of the other j−1 bits other than the $b_i$ bit in $b_{L+1}, b_{L+2}, \ldots,$ and $b_{N+1}$ are all 0. The network device may determine that the $b_i$ bit is an $(i+1)^{th}$ bit in the first field. After j and N are obtained, a value of L may be obtained according to the following equation: j=N+1−L, so that the network device can determine the quantity of TBs scheduled by using the downlink control information.

In some embodiments of this application, the NDI information of each of the L TBs is determined by using a bitmap based on L bits, namely, $b_{j+1}, b_{j+2}, \ldots,$ and $b_{N+1}$; or
the NDI information of each of the L TBs is determined by using a bitmap based on L bits, namely, $b_0, b_1, \ldots,$ and $b_{L-1}$.

For example, L bits are used to indicate, by using a bitmap, acknowledgment information of each of the L TBs scheduled by using the DCI. For example, bit locations of the L bits in the first field are $b_{j+1}, \ldots,$ and $b_{N+1}$. For example, $b_{j+1}, \ldots,$ and $b_{N+1}$ are L NDI bits. Each NDI bit in $b_{j+1}, \ldots,$ and $b_{N+1}$ is associated with each of the L TBs. For example, $b_{j+1}, \ldots,$ and $b_{N+1}$ are L ACK/NACK indicator bits. Each ACK/NACK bit in $b_{j+1}, \ldots,$ and $b_{N+1}$ is associated with each of the L TBs. NDI information of each of the L TBs may be flexibly indicated by using a bitmap.

In some embodiments of this application, the method performed by the terminal device may further include the following steps.

The terminal device determines, based on a first bit in the downlink control information, whether the downlink control information includes the first field, where the first bit is one bit.

When a bit state of the first bit is 1, the terminal device determines that the downlink control information includes the first field, where N is a positive integer greater than 1.

The downlink control information may further include one first bit, and a bit state of the first bit is 1, which may be used to indicate that the downlink control information can schedule both the newly transmitted TB and the retransmitted TB, that is, both the newly transmitted TB and the retransmitted TB can be scheduled in the L TBs. The terminal device parses the first bit in the downlink control information, to determine a TB type that can be scheduled by the network device.

In some embodiments of this application, the method performed by the terminal device may further include the following steps.

The terminal device determines, based on a first bit in the downlink control information, whether the downlink control information includes the first field, where the first bit is one bit.

When a bit state of the first bit is 0, the terminal device determines that the downlink control information does not include the first field.

The terminal device determines that the downlink control information includes a second bit, where the second bit is one bit.

When a bit state of the second bit is 1, the terminal device determines that the downlink control information can be used to schedule the maximum of N TBs, where N is a positive integer greater than 1, and all TBs scheduled by using the downlink control information are newly transmitted TBs, or all TBs scheduled by using the downlink control information are retransmitted TBs.

When a bit state of the second bit is 0, the terminal device determines that the downlink control information can be used to schedule only one TB.

The downlink control information may further include one first bit. If a bit state of the first bit is 0, it may indicate that TBs that can be scheduled by using the downlink control information can be only all newly transmitted TBs or only all retransmitted TBs. In this case, the downlink control information does not include the first field. The terminal device parses the first bit in the downlink control information, to determine a TB type that can be scheduled by the network device. The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, the network device sets the bit state of the second bit in the downlink control information to 0. The terminal device parses the first bit in the downlink control information, to determine a TB type that can be scheduled by the network device.

In some embodiments of this application, the method performed by the terminal device may further include the following steps.

The terminal device determines, based on a first bit in the downlink control information, whether the downlink control information includes the first field, where the first bit is one bit.

When a bit state of the first bit is 0, the terminal device determines that the downlink control information does not include the first field.

The terminal device determines that the downlink control information includes a second bit, where the second bit is one bit.

When a bit state of the second bit is 1, the terminal device determines that the downlink control information can be used to schedule the maximum of N TBs, where N is a positive integer greater than 1, and all TBs scheduled by using the downlink control information are newly transmitted TBs, or all TBs scheduled by using the downlink control information are retransmitted TBs.

When a bit state of the second bit is 0, the terminal device determines that the downlink control information further includes a third bit, where the third bit is one bit, and a bit state of the third bit is fixed at 1.

The terminal device determines, based on the third bit, that the downlink control information can be used to schedule only one TB.

The downlink control information may further include one first bit. When a bit state of the first bit is 0, the downlink control information may include one second bit, and a state of the second bit may be 1 or 0. When the downlink control information is used to schedule a plurality of newly transmitted TBs, or when the downlink control information is used to schedule a plurality of retransmitted TBs, the network device sets the bit state of the second bit in the downlink control information to 1; or when the downlink control information can be used to schedule only one TB, in addition to the first bit and the second bit, the downlink control information further includes a third bit, where the third bit is one bit, and the network device sets a bit state of the third bit to 0. The terminal device parses the first bit in the downlink control information, to determine a TB type that can be scheduled by the network device.

214: The terminal device determines a HARQ process number of each of the L TBs.

The terminal device may determine the HARQ process number of the first TB by using the first field in the downlink control information, and then determine HARQ process numbers of other TBs in the L TBs based on the HARQ process number of the first TB.

205: The network device sends or receives the L TBs based on the downlink control information.

215: The terminal device sends or receives the L TBs based on the determined HARQ process number of each of the L TBs and the NDI information of each of the L TBs.

This embodiment may be applicable to an uplink transmission scenario or a downlink transmission scenario. For example, during downlink transmission, the network device sends the L TBs, and the terminal device receives the L TBs. During uplink transmission, the terminal device sends the L TBs, and the network device receives the L TBs.

It can be learned from the example description in the foregoing embodiment that the terminal device receives the downlink control information from the network device, where the downlink control information can be used to schedule the maximum of N transport blocks (TBs), and N is a positive integer. When the terminal device determines that the downlink control information includes the first field, the first field includes the (N+2) bits, namely, $b_0, b_1, \ldots,$ and $b_{N+1}$. The terminal device determines, based on the first field, the quantity L of TBs scheduled by using the downlink control information, where L is a positive integer, and $1 \leq L \leq N$. When L is greater than 1, the L TBs scheduled by using the downlink control information can include both the newly transmitted TB and the retransmitted TB. In the j consecutive bits, namely, $b_k, b_{k+1}, \ldots,$ and $b_{k+j-1}$ in the first field, a bit state of only one bit is 1, bit states of other j−1 bits are all 0, j is a positive integer, j=N+1−L, k is a predefined integer, and k=0 or k=L+1. k=0, the bit state of the $b_j$ bit in the first field is 1, and the L consecutive bits, namely, $b_{j+1}, b_{j+2}, \ldots,$ and $b_{N+1}$ in the first field, carry the new data indicator (NDI) information of the L TBs scheduled by using the downlink control information; or k=L+1, the bit state of the $b_L$ bit in the first field is 1, and the L consecutive bits, namely, $b_0, b_1, \ldots,$ and $b_{L-1}$ in the first field, carry the NDI information of the L TBs scheduled by using the downlink control information. The terminal device determines the HARQ process number of each of the L TBs. The terminal device sends or receives the L TBs based on the determined HARQ process number of each of the L TBs and the NDI information of each of the L TBs. In this embodiment, only the (N+2) bits are required to support scheduling of any quantity of TBs in the N TBs by using the downlink control information, and HARQ process numbers and NDI information of the transport blocks can be flexibly indicated. This reduces indication overheads of the downlink control information, and further improves scheduling flexibility.

To better understand and implement the foregoing solutions in embodiments of this application, the following uses corresponding application scenarios as examples for specific description.

In this embodiment, a first node sends first information to a second node. The first node may be a base station or a device having a sending capability. The second node may be user equipment, a device having a receiving capability, or a base station. For example, the first node sends the first information to the second node by using downlink control information. That is, the downlink control information includes the first information. Alternatively, the first node sends the first information to the second node by using radio resource control signaling or media access control signaling. That is, the radio resource control signaling or the media access control signaling includes the first information.

It should be noted that the transmission in embodiments of this application is sending or receiving. If an end of communication implements transmission as sending, a peer end of the communication implements transmission as receiving.

The DCI can be used to schedule a maximum of N TBs. A value of a HARQ process number of each TB is 0, 1, 2, . . . , and N−1.

N may be a fixed value specified in a standard, or the first node configures N for the second node. For example, the first node configures N for the second node by using the radio resource control signaling, the first node configures N for the second node by using the media access control signaling, or the first node configures N for the second node by using physical layer signaling. For example, a value set of N is $\{1, 2, 4, 8\}$; a value set of N is $\{2, 4, 8\}$; a value set of N is $\{1, 4, 8\}$; or a value set of N is $\{1, 2, 8\}$.

When N is greater than 1, the DCI is used to support a newly transmitted TB and a retransmitted TB in a plurality of scheduled TBs. All TBs scheduled by using the DCI may alternatively be newly transmitted TBs. All TBs scheduled by using the DCI may alternatively be retransmitted TBs. A first field in the DCI is used to indicate HARQ process numbers and acknowledgment information that are of the plurality of TBs. For example, when N is greater than 1, the first field includes N+2 bits. For example, the N+2 bits in the first field are $b_0, b_1, \ldots, b_{N+1}$.

As shown in FIG. 3a, N+1−L bits in the N+2 bits in the first field are used to indicate a HARQ process number of a first TB, L bits in the N+2 bits in the first field are used to indicate feedback information by using a bitmap, and one of the N+2 bits in the first field is used to indicate a quantity of TBs scheduled by using the DCI (or a quantity of HARQ processes used by the DCI).

There is a first association relationship between process numbers of L HARQ processes. For example, the process numbers of the L HARQ processes meet the predefined first association relationship. For example, the first association relationship between the process numbers of the L HARQ processes is that the process numbers of the L HARQ processes are consecutive. To be specific, the process numbers of the L HARQ processes are k, k+1, k+2, . . . , and k+L−1. For example, the first association relationship between the process numbers of the L HARQ processes is that the process numbers of the L HARQ processes are equally spaced. To be specific, the process numbers of the L HARQ processes are k, k+2, k+4, . . . , and k+2L−2. For another example, the first association relationship between the process numbers of the L HARQ processes is that the process numbers of the L HARQ processes are obtained through calculation by using a formula. For example, a HARQ process number corresponding to a $(j+1)^{th}$ TB in L TBs is mod $\{(k+j), M\}$. M is a maximum quantity of HARQ processes that can be supported by the UE. For another example, the association relationship between the process numbers of the L HARQ processes is configured by a higher layer.

Refer to Embodiment 1a. The following describes an implementation of this embodiment from a first node side.

The first node indicates a quantity L of TBs scheduled by using one piece of DCI (or a quantity of HARQ processes used by the DCI). L is a positive integer greater than or equal to 1 and less than or equal to N.

The first node determines the quantity L of TBs scheduled by using the one piece of DCI or the quantity of HARQ processes used by the DCI, and determines a value of j based on N and L. The first node sets a state of a $b_j$ bit in the first field to 1, for example, j=N+1−L.

The first node indicates acknowledgment information of each of the L TBs scheduled by using the DCI.

The first node determines the acknowledgment information of each of the L TBs. The first node uses, by using a bitmap, L bits to indicate the acknowledgment information of each of the L TBs scheduled by using the DCI. For example, bit locations of the L bits in the first field are $b_{j+1}, \ldots,$ and $b_{N+1}$. For example, $b_{j+1}, \ldots,$ and $b_{N+1}$ are L NDI bits. Each NDI bit in $b_{j+1}, \ldots,$ and $b_{N+1}$ is associated with each of the L TBs. For another example, $b_{j+1}, \ldots,$ and $b_{N+1}$ are L ACK/NACK indicator bits. Each ACK/NACK bit in $b_{j+1}, \ldots,$ and $b_{N+1}$ is associated with each of the L TBs.

Table 1 is a Table of a Value of an NDI Bit in the Downlink Control Information

|  | NDI of a first TB scheduled by using the DCI | NDI of a second TB scheduled by using the DCI | NDI of a third TB scheduled by using the DCI | . . . | NDI of an $L^{th}$ TB scheduled by using the DCI |
|---|---|---|---|---|---|
| NDI bit | $b_{j+1}$ | $b_{j+2}$ | $b_{j+3}$ | . . . | $b_{N+1}$ |

Table 2 is a Table of a Value of Another NDI Bit in the Downlink Control Information

|  | NDI of a first TB scheduled by using the DCI | NDI of a second TB scheduled by using the DCI | NDI of a third TB scheduled by using the DCI | . . . | NDI of an $L^{th}$ TB scheduled by using the DCI |
|---|---|---|---|---|---|
| ACK/ NACK indicator bit | $b_{j+1}$ | $b_{j+2}$ | $b_{j+3}$ | . . . | $b_{N+1}$ |

The first node indicates the HARQ process number of the first TB.

The first TB is a TB in the L TBs scheduled by using the DCI. For example, the first TB is one TB that comes first in the L TBs. For another example, the first TB is an $x^{th}$ (x>1) TB block in the L TBs, and x is a predefined value or a value configured by the base station. The HARQ process numbers of the TBs other than the first TB in the L TBs are obtained based on the HARQ process number of the first TB. For example, the L HARQ process numbers of the L TBs meet the foregoing first association relationship.

The first node sets bit values of j bits in the (N+2) bits included in the first field. For example, the j bits are j bits on the left side of the $b_j$ bit in the (N+2) bits included in the first field. To be specific, bit locations of the j bits are $b_0, \ldots,$ and $b_{j−1}$. The first node sets a bit state of one of the j bits to 1, and the first node sets states of other j−1 bits in the j bits to 0. Because there are the j bits, in a total of j types of bit states whose length is the j bits, the states of the j−1 bits in the j bits are 0 and a state of one of the j bits is 1. Therefore, the first node uses the j bit states to respectively indicate j HARQ process numbers of the first TB. The first node determines the HARQ process number of the first TB, and sets the bit states of the j bits according to an association relationship between the HARQ process number of the first TB and the bit states of the j bits. For example, the j bit states of the j bits are used to respectively indicate the j HARQ process numbers of the first TB. For example, the j HARQ process numbers are 0, 1, . . . , and j−1. Therefore, the first node sets, based on the HARQ process number of the first TB, the bit states, of the j bits, corresponding to the HARQ process number of the first TB.

Table 3 is a Table Used to Indicate the HARQ Process Number of the First TB

| Bit states of $b_0, \ldots,$ and $b_{j-1}$ | HARQ process number of the first TB |
|---|---|
| 1000 . . . 00 | 0 |
| 0100 . . . 00 | 1 |
| . . . | . . . |
| 00 . . . 0010 | j − 2 |
| 00 . . . 0001 | j − 1 |

For example, if the HARQ process number of the first TB=i, $b_i=1$, and states of j−1 bits other than $b_i$ in the j bits are all 0. For example, the first node sets bi to 1, and sets the states of the j−1 bits other than $b_i$ in the j bits to 0. The first node sends the DCI to the second node.

As shown in Table 4, N=8 and L=3. A value of the HARQ process number of the first TB is from 0 to 5. If the HARQ process number of the first TB=3, $b_3=1$, and a state of each of bits, namely, $b_0$, $b_1$, $b_2$, $b_4$, and $b_5$, is 0.

Table 4 is a Table Used to Indicate the HARQ Process Number of the First TB when N=8 and L=3

| Bit states of $b_0$ to $b_5$ | HARQ process number of the first TB |
|---|---|
| 100000 | 0 |
| 010000 | 1 |
| 001000 | 2 |
| 000100 | 3 |
| 000010 | 4 |
| 000001 | 5 |

The following describes a specific implementation method in this embodiment by using an example in which N=8. Because N=8, the first field includes N+2=10 bits used to indicate HARQ process numbers and acknowledgment information that are of a plurality of TBs. It is assumed that the 10 bits included in the first field are $b_0$, $b_1$, . . . , and $b_9$.

The first node indicates that three TBs are scheduled by using the DCI, that is, L=3. Because j=N+1−L, j is equal to 6. The first node sets the $b_6$ bit to 1.

The first node indicates that a HARQ process number of a first TB in the three TBs scheduled by using the DCI is 3. In this case, the first node indicates that a bit state of $b_3$ in the bits, namely, $b_0$ to $b_5$, of the HARQ process number is 1, and a state of each of the bits, namely, $b_0$, $b_1$, $b_2$, $b_4$, and $b_5$ is 0. That is, the bit states of the bits, namely, $b_0$ to $b_5$ are 000100.

The first node indicates feedback information of each of the three TBs scheduled by using the DCI. It is assumed that the feedback information is an NDI. NDI indicators of the three TBs are: 0, 1, and 1. In this case, states of bits, namely, $b_7$ to $b_9$, are 011.

In conclusion, states of the 10 bits, namely, b0 to b9, are 0001001011. The first field in the downlink control information carries $b_0$ to $b_9$, and the first node sends the downlink control information to the user equipment.

FIG. 4a is a schematic diagram in which 10 bits included in a first field are used to indicate a quantity L of TBs scheduled by using DCI, a HARQ process number of a first TB, and feedback information of each of the L TBs according to an embodiment of this application. When N=8, and the quantity L of TBs scheduled by using the DCI is 1, 2, . . . , and 8, 10 bits ($b_0$ to $b_9$) included in the first field is used to indicate the quantity of TBs scheduled by using the DCI (or indicate a quantity of used HARQ processes), the HARQ process number of the first TB, and a feedback information bit corresponding to each TB. Each X in FIG. 4a represents one feedback information bit (for example, an NDI bit or an ACK/NACK indicator bit). Different X represents different bits, and therefore there are different bit states.

Embodiment 1b: The following describes another implementation scenario of this embodiment from a first node side.

The first node indicates a quantity L of TBs scheduled by using one piece of DCI (or a quantity of used HARQ processes).

The first node determines the quantity L of TBs scheduled by using the one piece of DCI, and determines a value of j based on N and L. The first node sets a state of a $b_j$ bit in the first field to 0, for example, j=N+1−L.

The first node indicates acknowledgment information of each of the L TBs scheduled by using the DCI.

The first node indicates the HARQ process number of the first TB.

A first association relationship between the first TB and process numbers of L HARQ processes is described above. Details are not described herein again.

The first node sets bit values of j bits in the (N+2) bits included in the first field. Bit locations of the j bits are described above. The first node sets a state of one of the j bits to 0, and sets states of other j−1 bits to 1. For example, if the HARQ process number of the first TB=i, the first node sets $b_i=0$, and sets all states of j−1 bits other than bi in the j bits to 1.

The following uses an example to show a bit state corresponding to the HARQ process number of the first TB when N=8 and L=3. As shown in Table 5, if the HARQ process number of the first TB=3, $b_3=0$, and a state of each of bits, namely, $b_0$, $b_1$, $b_2$, $b_4$, and $b_5$, is 1.

Table 5 is a Table Used to Indicate the HARQ Process Number of the First TB when N=8 and L=3

| Bit states of $b_0$ to $b_5$ | HARQ process number of the first TB |
|---|---|
| 011111 | 0 |
| 101111 | 1 |
| 110111 | 2 |
| 111011 | 3 |
| 111101 | 4 |
| 111110 | 5 |

FIG. 4b is a schematic diagram in which 10 bits are used to indicate a quantity L of TBs scheduled by using DCI, a HARQ process number of a first TB, and feedback information of each of the L TBs according to an embodiment of this application. When N=8, and the quantity L of TBs scheduled by using the DCI is 1, 2, . . . , and 8, 10 bits ($b_0$ to $b_9$) included in the first field is used to indicate the quantity of TBs scheduled by using the DCI (or indicate a quantity of used HARQ processes), the HARQ process number of the first TB, and a feedback information bit corresponding to each TB. A meaning of X is described above. Details are not described herein again.

Embodiment 1c: The following describes an implementation scenario of this embodiment from a second node side.

The second node determines to receive the DCI. The DCI can be used to schedule a maximum of N TB blocks.

N may be a fixed value specified in a standard, or the second node obtains a value of N by receiving signaling sent by the first node. For example, the first node configures N for the second node by using the radio resource control signaling, the first node configures N for the second node by using the media access control signaling, or the first node configures N for the second node by using physical layer signaling. For example, a value set of N is $\{1, 2, 4, 8\}$; a value set of N is $\{2, 4, 8\}$; a value set of N is $\{1, 4, 8\}$; or a value set of N is $\{1, 2, 8\}$.

The second node receives the DCI, and determines, based on N+2 bits ($b_0, b_1, \ldots,$ and $b_N+1$) included in the first field in the DCI, a quantity of TBs scheduled by using the DCI (or indicates a quantity of used HARQ processes), the HARQ process number of the first TB, and a feedback information bit corresponding to each TB.

As shown in FIG. 3a, N+1-L bits in the N+2 bits in the first field are used to indicate the HARQ process number of the first TB, L bits in the N+2 bits in the first field are used to indicate feedback information, and one of the N+2 bits in the first field is used to indicate the quantity of TBs scheduled by using the DCI (or the quantity of HARQ processes indicated by using the DCI).

The second node determines the HARQ process number of the first TB scheduled by using the DCI.

For example, in $b_0, b_1, \ldots, b_{N+1}$, a first bit location, from left to right, whose bit state is 1 is determined. If it is determined that a bi bit is the first bit whose bit state is 1, the HARQ process number of the first TB is i. Alternatively, the second node determines the HARQ process number of the first TB according to a correspondence between a bit state and a HARQ process number of a first TB. Alternatively, the second node determines the HARQ process number of the first TB according to a correspondence between a bit state, L, and a HARQ process number of a first TB.

The second node determines a quantity L of TB blocks scheduled by using the DCI (or a quantity of used HARQ processes).

For example, in ($b_0, b_1, \ldots, b_{N+1}$), a second bit location, from left to right, whose bit state is 1 is determined. If it is determined that a bj bit is the second bit whose bit state is 1, the second node determines that the quantity L of TB blocks scheduled by using the DCI (or the quantity of used HARQ processes) is equal to N+1-j. Alternatively, the second node determines L according to the correspondence between a bit state, L, and a HARQ process number of a first TB.

The second node determines HARQ process numbers respectively corresponding to the L TBs scheduled by using the DCI.

HARQ process numbers of TBs other than the first TB in the L TBs are determined based on the HARQ process number of the first TB. There is a first association relationship between process numbers of L HARQ processes.

The second node determines HARQ-ACK acknowledgment information of each of the L TBs scheduled by using the DCI.

The second node determines that the L bits in the DCI are used to indicate, by using a bitmap, HARQ-ACK acknowledgment information of each of the L TBs. For example, bit locations of the L bits are $b_{j+1}, \ldots,$ and $b_{N+1}$. Each bit in $b_{j+1}, \ldots,$ and $b_{N+1}$ is an NDI of each of the L TBs. For another example, each bit in $b_{j+1}, \ldots,$ and $b_{N+1}$ is used to indicate whether each of the L TBs is a newly transmitted TB or a retransmitted TB.

The following describes this embodiment by using an example in which the second node receives a specific bit state. It is assumed that N=8. Bit states of 10 bits ($b_0$ to $b_9$) received by the second node are 0110101010. The second node determines, from left to right, that a first bit location whose bit state is 1 is $b_1$ (that is, i=1). Therefore, it is determined that the HARQ process number of the first TB=1. The second node determines, from left to right, that a second bit location whose bit state is 1 is $b_2$ (that is, j=2), and therefore determines that the quantity of TBs scheduled by using the DCI is L=N+1−j=8+1−2=7. If HARQ process numbers of other TBs are determined in ascending order based on the first TB, the HARQ process numbers of the other six TBs are 2, 3, 4, 5, 6, and 7. The second node determines that the seven bits $b_3$ to $b_9$ correspond to acknowledgment information of each of the seven TBs. The acknowledgment information may be an NDI or explicit ACK/NACK information.

Table 6 is a Bit Table Corresponding to an NDI

| | TB whose HARQ process number is 1 | TB whose HARQ process number is 2 | TB whose HARQ process number is 3 | TB whose HARQ process number is 4 | TB whose HARQ process number is 5 | TB whose HARQ process number is 6 | TB whose HARQ process number is 7 |
|---|---|---|---|---|---|---|---|
| NDI | 0 ($b_3$) | 1 ($b_4$) | 0 ($b_5$) | 1 ($b_6$) | 0 ($b_7$) | 1 ($b_8$) | 0 ($b_9$) |

Table 7 is a Bit Table Corresponding to an NDI

| | TB whose HARQ process number is 1 | TB whose HARQ process number is 2 | TB whose HARQ process number is 3 | TB whose HARQ process number is 4 | TB whose HARQ process number is 5 | TB whose HARQ process number is 6 | TB whose HARQ process number is 7 |
|---|---|---|---|---|---|---|---|
| Explicit ACK/NACK indicator | 0 ($b_3$) | 1 ($b_4$) | 0 ($b_5$) | 1 ($b_6$) | 0 ($b_7$) | 1 ($b_8$) | 0 ($b_9$) |

Embodiment 1d: The following describes another implementation scenario of this embodiment from a second node side.

The second node receives DCI, where the DCI includes a first field, and the first field includes N+2 bits. The N+2 bits are denoted as $(b_0, b_1, \ldots, b_{N+1})$. The DCI can be used to schedule a maximum of N TB blocks.

The second node determines a HARQ process number of a first TB scheduled by using the DCI.

For example, in $(b_0, b_1, \ldots, b_{N+1})$, a first bit location, from left to right, whose bit state is 0 is determined. If it is determined that a $b_i$ bit is the first bit whose bit state is 0, the HARQ process number of the first TB is i.

The second node determines a quantity L of TB blocks scheduled by using the DCI (or a quantity of HARQ processes used by the DCI).

For example, in $(b_0, b_1, \ldots, b_{N+1})$, a second bit location, from left to right, whose bit state is 0 is determined. If it is determined that a $b_j$ bit is the second bit whose bit state is 0, the second node determines that the quantity L of TB blocks scheduled by using the DCI (or the quantity of used HARQ processes) is equal to N+1−j.

The second node determines HARQ process numbers respectively corresponding to the L TBs scheduled by using the DCI.

The second node determines acknowledgment information of each of the L TBs scheduled by using the DCI.

The second node determines that L bits, on the right of the $b_j$ bit in the DCI, are used to indicate, by using a bitmap, the acknowledgment information of each of the L TBs.

Optionally, in this embodiment, N=8 or N=4.

It can be learned from the foregoing example description that in this embodiment, only 10 bits are required to support scheduling of any quantity of TBs in eight TBs by using one piece of DCI when HARQ process numbers are consecutive, and HARQ-ACK acknowledgment information of the transport blocks and the HARQ process number can be flexibly indicated. In this way, scheduling flexibility is improved, and DCI indication overheads are reduced.

The following describes another embodiment of this application by using an example.

A first node sends a first bit to a second node. The first bit is one bit. For example, DCI includes the first bit. Alternatively, RRC signaling includes the first bit. The first node performs data transmission with the second node by using a maximum of N HARQ process numbers, and the N HARQ process numbers are 0, 1, 2, . . . , and N−1. In this embodiment, transmission may be sending or receiving. A node on one side of the communication uses the transmission for sending, and a node on a peer side of the communication uses the transmission for receiving.

When a bit state of the first bit is 1, the first bit is used to indicate that the DCI can be used to schedule a maximum of N TBs. N is a positive integer greater than 1. A value of N is indicated by the first node or predefined. When the first bit is used to indicate that the DCI can be used to schedule the maximum of N TBs, the TBs scheduled by using the DCI may include a newly transmitted TB and a retransmitted TB. When the first bit is used to indicate that the DCI can be used to schedule the maximum of N TBs, all TBs scheduled by using the DCI may be newly transmitted TBs. When the first bit is used to indicate that the DCI can be used to schedule the maximum of N TBs, all TBs scheduled by using the DCI may be retransmitted TBs. In this case, the DCI further includes a first field. For example, N+2 bits included in the first field are used to indicate a plurality of TBs according to the method in Embodiment 1. Details are not described herein again.

When a bit state of the first bit is 0, the DCI can be used to schedule a maximum of N TBs, or the DCI can be used to schedule one TB. When the DCI can be used to schedule the maximum of N TBs, all TBs scheduled by using the DCI can only be newly transmitted TBs, or all TBs scheduled by using the DCI can only be retransmitted TBs.

For example, when a bit state of the first bit is 0, the DCI further includes a second bit. The second bit is one bit, and the second bit indicates whether the DCI can be used to schedule the maximum of N TBs, or the second bit indicates that the DCI is used to schedule one TB. For example, when a state of the second bit is 1, the second bit indicates that the DCI can be used to schedule the maximum of N TBs. For example, when a state of the second bit is 0, the second bit indicates that the DCI is used to schedule one TB. When the second bit indicates that the DCI can be used to schedule the maximum of N TBs, another bit in the DCI indicates that all TBs scheduled by using the DCI are newly transmitted TBs, or all TBs scheduled by using the DCI are retransmitted TBs. For example, the one bit may be one NDI bit. When the second bit indicates that the DCI can be used to schedule the maximum of N TBs, there are still N bits, in the DCI, used to indicate N HARQ process numbers by using a bitmap. Each of the N bits corresponds to one HARQ process number. For example, if a state of a bit is 0, it indicates that a HARQ process number corresponding to the bit is not indicated (or used) by the DCI. For example, if a state of a bit is 1, it indicates that a HARQ process number corresponding to the bit is indicated (or used) by the DCI. If the HARQ process number is indicated (or used) by the DCI, it indicates that a TB related to the HARQ process number is scheduled by using the DCI. If the HARQ process number is not indicated (or used) by the DCI, it indicates that a TB related to the HARQ process number is not scheduled by using the DCI. Therefore, a quantity of HARQ process numbers indicated by using the DCI is a quantity of TBs scheduled by using the DCI. Therefore, HARQ process numbers of the plurality of TBs scheduled by using the DCI may be inconsecutive.

Table 8 is a Table of a Correspondence Between N Bits and HARQ Process Numbers

| #$^{th}$ bit in the N bits | 1 | 2 | ... | ... | ... | ... | ... | N |
|---|---|---|---|---|---|---|---|---|
| HARQ process number corresponding to #$^{th}$ bit | 0 | 1 | ... | ... | ... | ... | ... | N − 1 |

When the second bit is used to indicate that the DCI is used to schedule one TB, M bits in the DCI are used to indicate HARQ process numbers of the TB, and one bit in the DCI indicates an NDI. For example, M is 3, M is 4, or M is 1.

When the DCI includes the first bit, the second node determines, based on the first bit and/or the second bit in the DCI, a mode in which the DCI is scheduled. If the state of the first bit is equal to 1, the DCI is scheduled in a first mode. If the state of the first bit is equal to 0 and the state of the second bit is equal to 1, the DCI is scheduled in a second mode. If the state of the first bit is equal to 0, and the state of the second bit is equal to 0, the DCI is scheduled in a third mode.

Figure 5A:
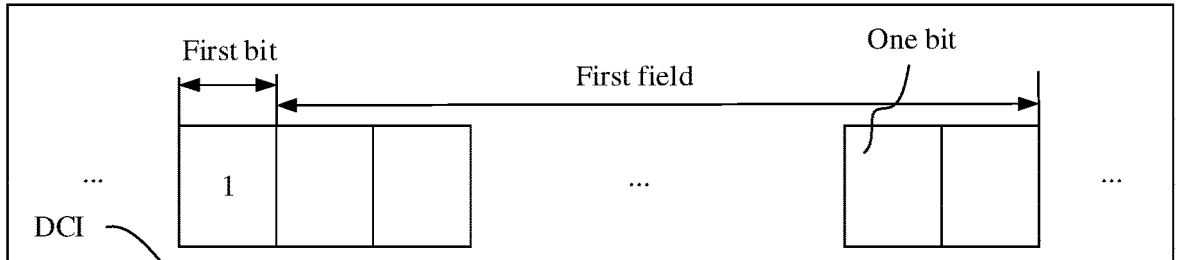
FIG. 5a is a schematic diagram of a composition structure of downlink control information according to an embodiment of this application.

First mode: FIG. 5a is a schematic diagram of a composition structure of downlink control information according to an embodiment of this application. DCI can be used to schedule a maximum of N TBs, and a plurality of TBs scheduled by using the DCI may include both a newly transmitted TB and a retransmitted TB.

Figure 5B:
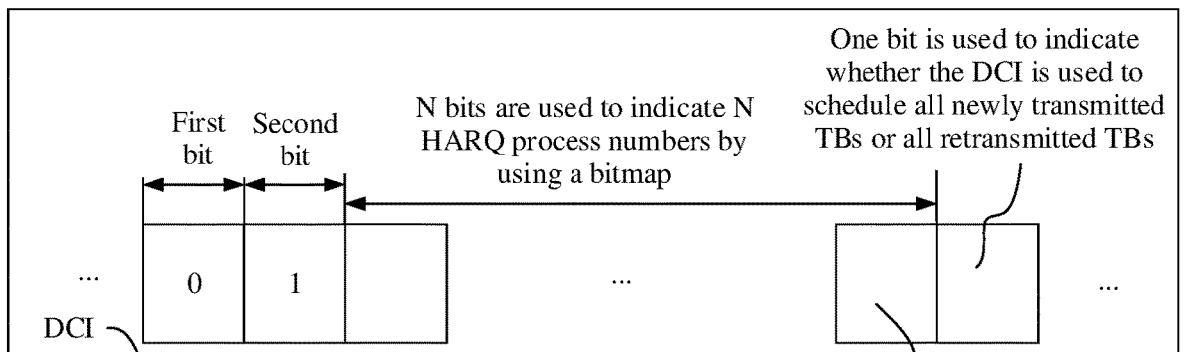
FIG. 5b is a schematic diagram of another composition structure of downlink control information according to an embodiment of this application.

Second mode: FIG. 5b is a schematic diagram of another composition structure of downlink control information according to an embodiment of this application. DCI can be used to schedule a maximum of N TBs, and all TBs scheduled by using the DCI are newly transmitted TBs or retransmitted TBs.

Figure 5C:
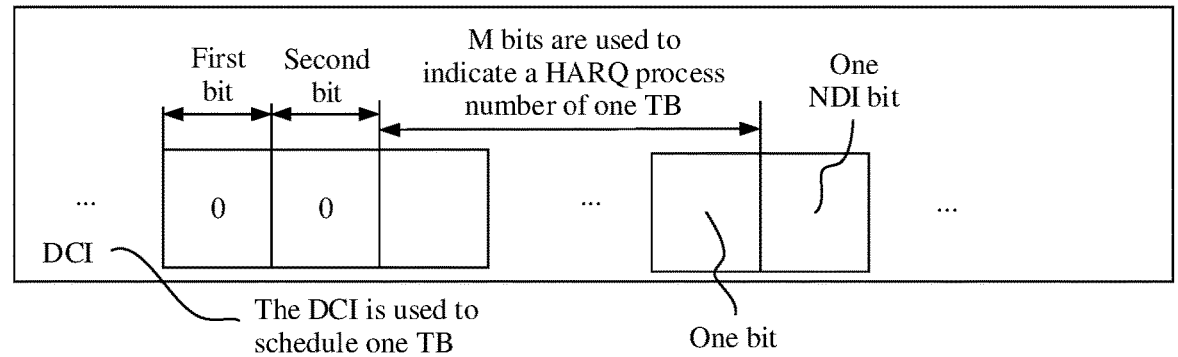
FIG. 5c is a schematic diagram of another composition structure of downlink control information according to an embodiment of this application.

Third mode: FIG. 5c is a schematic diagram of another composition structure of downlink control information according to an embodiment of this application. DCI is used to schedule one TB.

Table 9 is an Indication Table of a DCI Scheduling Mode

| Bit state | DCI scheduling mode |
| --- | --- |
| State of the first bit = 1 | First mode |
| State of the first bit = 0, and the state of the second bit = 1 | Second mode |
| State of the first bit = 0, and the state of the second bit = 0 | Third mode |

It should be noted that when the DCI is scheduled in the first mode, the DCI includes the first field, but the DCI does not include the second bit. When the DCI is scheduled in the second mode, the DCI includes the first bit and the second bit, but the DCI does not include the first field. The DCI includes N bits, indicating N HARQ process numbers by using a bitmap, and the DCI includes one NDI bit. When the DCI is scheduled in the third mode, the DCI includes the first bit and the second bit, but the DCI does not include the first field. The DCI includes M bits used to indicate a HARQ process number of one TB, and the DCI includes one NDI bit. The following uses an example to describe a DCI structure. A first DCI format is a DCI format specified in a standard. For example, the first DCI format is a DCI format 6-0A, the first DCI format is a DCI format 6-1A, the first DCI format is a DCI format 6-0B, or the first DCI format is a DCI format 6-1B.

Example 1: The Following Information is Transmitted by Using the First DCI Format A first bit occupies one bit.

A first field occupies (N+2) bits, and this field is present only when the first bit is set to 1.

A second bit occupies one bit, and this field is present only when the first bit is set to 0.

A HARQ process number occupies N bits, and this field is present only when the second bit is set to 1.

A HARQ process number occupies M bits, and the field is present only when the second bit is set to 0.

A new data indicator occupies one bit, and this field is present only when the first bit is set to 0.

Example 2: The Following Information is Transmitted by Using the First DCI Format A first bit occupies one bit.

A first field occupies (N+2) bits, and this field is present only when the first bit is set to 1.

A second bit occupies one bit, and this field is present only when the first bit is set to 0.

A HARQ process number occupies N bits, and this field is present only when the second bit is set to 1.

A HARQ ACK indicator (or an ACK/NACK indicator, or an NDI indicator) occupies one bit, and this field is present only when the second bit is set to 1.

A HARQ process number occupies M bits, and the field is present only when the second bit is set to 0.

A new data indicator occupies one bit, and this field is present only when the second bit is set to 0.

For another example, if the state of the first bit is equal to 0 and the state of the second bit is equal to 0, the DCI is scheduled in the second mode. If the state of the first bit is equal to 0, and the state of the second bit is equal to 1, the DCI is scheduled in the third mode.

Table 10 is an Indication Table of a DCI Scheduling Mode

| Bit state | DCI scheduling mode |
| --- | --- |
| State of the first bit = 1 | First mode |
| State of the first bit = 0, and the state of the second bit = 0 | Second mode |
| State of the first bit = 0, and the state of the second bit = 1 | Third mode |

As shown in FIG. 5c, in an example of the third mode, the DCI may further include a third bit, and a value of the third bit is 1. For another example, when the DCI is scheduled in the third mode, the DCI further includes a third bit. If the state of the first bit is equal to 1, the DCI is scheduled in the first mode. If the state of the first bit is equal to 0 and the state of the second bit is equal to 1, the DCI is scheduled in the second mode. If the state of the first bit is equal to 0, the state of the second bit is equal to 0, and a state of the third bit is equal to 1, the DCI is scheduled in the third mode. UE may determine, based on one or more states of the first bit, the second bit, and the third bit, a mode in which the DCI is scheduled. Alternatively, UE determines, starting from a bit location of the first bit, a first bit location whose state is 1. If the first bit location whose state is 1 is the bit location of the first bit, the DCI is scheduled in the first mode. If the first bit location whose state is 1 is a bit location of the second bit, the DCI is scheduled in the second mode. If the first bit location whose state is 1 is a bit location of the third bit, the DCI is scheduled in the third mode.

Similarly, when the DCI is scheduled in the first mode, the DCI includes the first bit, but the DCI does not include the second bit and the third bit. When the DCI is scheduled in the second mode, the DCI includes the first bit and the second bit, but the DCI does not include the third bit and the first field. When the DCI is scheduled in the third mode, the DCI includes the first bit, the second bit, and the third bit, but the DCI does not include the first field.

Example 3: The Following Information is Transmitted by Using the First DCI Format A first bit occupies one bit.

A first field occupies (N+2) bits, and this field is present only when the first bit is set to 1.

A second bit occupies one bit, and this field is present only when the first bit is set to 0.

A HARQ process number occupies N bits, and this field is present only when the second bit is set to 1.

A HARQ ACK indicator (or an ACK/NACK indicator) occupies one bit, and this field is present only when the second bit is set to 1.

A third bit occupies one bit. This field is present when the first bit is set to 0 and the second bit is set to 0, and a bit value is fixedly set to 1 (or fixedly set to 0).

A HARQ process number occupies M bits, and the field is present only when the second bit is set to 0.

A new data indicator occupies one bit, and this field is present only when the second bit is set to 1.

For another example, the second bit includes two bits. A state of the first bit is 1, the DCI is scheduled in the first mode, and the DCI includes the first field. The state of the first bit is 0, the DCI does not include the first field, and the DCI includes the second bit. The second bit includes two bits. A state of the second bit indicates that the DCI can be used to schedule a maximum of N newly transmitted TBs. Another state of the second bit indicates that the DCI can be used to schedule a maximum of N retransmitted TBs. Still another state of the second bit indicates that the DCI is scheduled in the third mode.

FIG. 6 is a schematic diagram in which 10 bits included in a first field are used to indicate a quantity L of TBs scheduled by using DCI, a HARQ process number of a first TB, and feedback information of each of the L TBs according to an embodiment of this application. For example, $b_0$ is the foregoing first bit, and $b_2$ and $b_3$ are the foregoing second bit.

It can be learned from the foregoing example description that in this embodiment, no bit needs to be added, but the HARQ process number can be flexibly indicated. In this way, scheduling flexibility is improved, and DCI indication overheads are reduced.

It should be noted that for ease of brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that embodiments described in this specification all belong to example embodiments, and the involved actions and modules are not necessarily required by this application.

To better implement the foregoing solutions in embodiments of this application, the following further provides a related apparatus for implementing the foregoing solutions.

Figure 7:
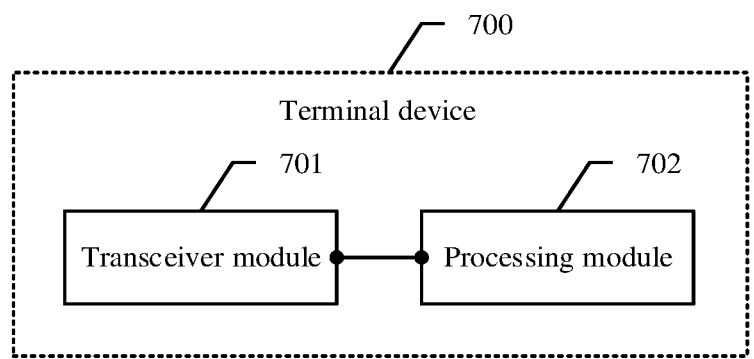
FIG. 7 is a schematic diagram of a composition structure of a terminal device according to an embodiment of this application.

FIG. 7 is a schematic diagram of a composition structure of a terminal device according to an embodiment of this application. The terminal device 700 includes a transceiver module 701 and a processing module 702.

The transceiver module is configured to receive downlink control information from a network device, where the downlink control information can be used to schedule a maximum of N transport blocks (TBs), and N is a positive integer.

When the processing module is configured to determine that the downlink control information includes a first field, the first field includes (N+2) bits, namely, $b_0, b_1, \ldots$, and $b_{N+1}$.

A quantity L of TBs scheduled by using the downlink control information is determined based on the first field, where L is a positive integer, and $1 \le L \le N$.

When L is greater than 1, the L TBs scheduled by using the downlink control information can include both a newly transmitted TB and a retransmitted TB.

In j consecutive bits, namely, $b_k, b_{k+1}, \ldots$, and $b_{k+j-1}$ in the first field, a bit state of only one bit is 1, bit states of other j−1 bits are all 0, j is a positive integer, j=N+1−L, k is a predefined integer, and k=0 or k=L+1.

k=0, a bit state of a $b_j$ bit in the first field is 1, and L consecutive bits, namely, $b_{j+1}, b_{j+2}, \ldots$, and $b_{N+1}$ in the first field, carry new data indicator (NDI) information of the L TBs scheduled by using the downlink control information; or k=L+1, a bit state of a $b_L$ bit in the first field is 1, and L consecutive bits, namely, $b_0, b_1, \ldots$, and $b_{L-1}$ in the first field, carry NDI information of the L TBs scheduled by using the downlink control information.

The processing module is configured to determine a HARQ process number of each of the L TBs.

The transceiver module is configured to send or receive the L TBs based on the determined HARQ process number of each of the L TBs and the NDI information of each of the L TBs.

In some embodiments of this application, L, a HARQ process number of a first TB in the L TBs, and the NDI information of each of the L TBs are determined according to a correspondence between a bit state of the first field, and a quantity of TBs, the HARQ process number of the first TB, and the NDI information of the L TBs, and the first TB is one of the L TBs.

In some embodiments of this application, the processing module is configured to: use a $b_0$ bit as a start bit, determine that a $b_i$ bit is a first bit, whose bit state is 1, in the (N+2) bits, where a HARQ process number of a first TB is i, and determine, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs; or use a $b_{L+1}$ bit as a start bit, determine that a $b_i$ bit is a first bit, whose bit state is 1, in the (N+2) bits, where a HARQ process number of a first TB is i−L−1, and determine, according to a first association relationship between the HARQ process number of the first TB and process numbers of L HARQ processes, a HARQ process number of another TB other than the first TB in the L TBs, where the first TB is one of the L TBs, and the L HARQ processes are HARQ processes corresponding to the L TBs.

In some embodiments of this application, the processing module is configured to: use a $b_0$ bit as a start bit, and determine that a $b_m$ bit is a second bit, whose bit state is 1, in the (N+2) bits, where j=m, and L=N+1−m: or the processing module is configured to: use a $b_{N+1}$ bit as a start bit, and determine that a $b_m$ bit is a second bit, whose bit state is 1, from right to left in the (N+2) bits, where j=N+1−m, and L=m.

In some embodiments of this application, the NDI information of each of the L TBs is determined by using a bitmap based on L bits, namely, $b_{j+1}, b_{j+2}, \ldots$, and $b_{N+1}$; or the NDI information of each of the L TBs is determined by using a bitmap based on L bits, namely, $b_0$, $b_1$, ..., and $b_{L-1}$.

In some embodiments of this application, the processing module is configured to: determine, based on a first bit in the downlink control information, whether the downlink control information includes the first field, where the first bit is one bit; and when a bit state of the first bit is 1, determine that the downlink control information includes the first field, where N is a positive integer greater than 1.

In some embodiments of this application, the processing module is configured to: determine, based on a first bit in the downlink control information, whether the downlink control information includes the first field, where the first bit is one bit; when a bit state of the first bit is 0, determine that the downlink control information does not include the first field; determine that the downlink control information includes a second bit, where the second bit is one bit; when a bit state of the second bit is 1, determine that the downlink control information can be used to schedule a maximum of N TBs, where N is a positive integer greater than 1, and all TBs scheduled by using the downlink control information are newly transmitted TBs, or all TBs scheduled by using the downlink control information are retransmitted TBs; or when a bit state of the second bit is 0, determine that the downlink control information can be used to schedule only one TB.

In some embodiments of this application, the processing module is configured to: determine, based on a first bit in the downlink control information, whether the downlink control information includes the first field, where the first bit is one bit; when a bit state of the first bit is 0, determine that the downlink control information does not include the first field; determine that the downlink control information includes a second bit, where the second bit is one bit; when a bit state of the second bit is 1, determine that the downlink control information can be used to schedule the maximum of N TBs, where N is a positive integer greater than 1, and all TBs scheduled by using the downlink control information are newly transmitted TBs, or all TBs scheduled by using the downlink control information are retransmitted TBs; when a bit state of the second bit is 0, determine that the downlink control information further includes a third bit, where the third bit is one bit, and a bit state of the third bit is fixed at 1; or determine, based on the third bit, that the downlink control information can be used to schedule only one TB.

Figure 8:
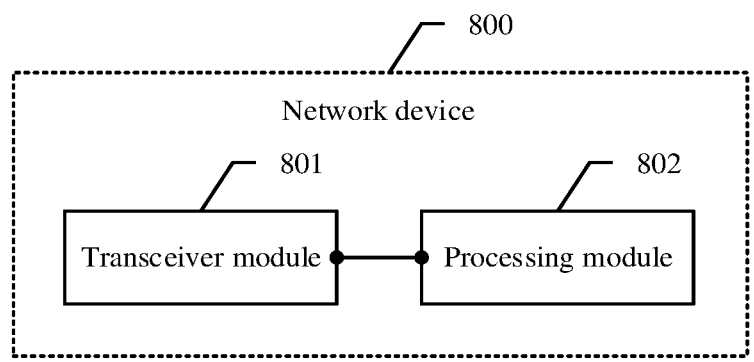
FIG. 8 is a schematic diagram of a composition structure of a network device according to an embodiment of this application.

As shown in FIG. 8, an embodiment of this application provides a network device 800, including a transceiver module 801 and a processing module 802.

The processing module is configured to determine a quantity L of transport blocks (TBs) scheduled by using downlink control information, where the downlink control information can be used to schedule a maximum of N TBs, N is a positive integer, L is a positive integer, and $1 \leq L \leq N$.

The processing module is configured to determine HARQ process numbers of the L TBs.

The processing module is configured to determine new data indicator (NDI) information of the L TBs.

The transceiver module is configured to send the downlink control information to a terminal device, where the downlink control information can be used to schedule both a newly transmitted TB and a retransmitted TB, the downlink control information includes a first field, and the first field includes (N+2) bits, namely, $b_0$, $b_1$, ..., and $b_{N+1}$.

In j consecutive bits, namely, $b_k$, $b_{k+1}$, ..., and $b_{k+j-1}$ in the first field, a state of only one bit is 1, states of other j−1 bits are all 0, j is a positive integer, j=N+1−L, k is a predefined integer, and k=0 or k=L+1.

k=0, a bit state of a $b_j$ bit in the first field is 1, and L consecutive bits, namely, $b_{j+1}$, $b_{j+2}$, ..., and $b_{N+1}$ in the first field, carry NDI information of the L TBs scheduled by using the downlink control information; or k=L+1, a bit state of a $b_L$ bit in the first field is 1, and L consecutive bits, namely, $b_0$, $b_1$, ..., and $b_{L-1}$ in the first field, carry NDI information of the L TBs scheduled by using the downlink control information.

The transceiver module is configured to send or receive the L TBs based on the downlink control information.

In some embodiments of this application, the processing module is configured to determine one or more bit states of the first field according to a correspondence between a bit state of the first field, and L, a HARQ process number of a first TB in the L TBs, and the NDI information of each of the L TBs, where the first TB is one of the L TBs.

In some embodiments of this application, the processing module is configured to: when k=0, determine that the HARQ process number of the first TB is i, where the first TB is one TB that comes first in the L TBs, and $0 \leq i \leq j-1$, use a $b_0$ bit as a start bit, and determine that a bit state of a $b_i$ bit in the first field is 1 and bit states of other j−1 bits other than the $b_i$ bit in $b_0$, $b_1$, ..., and $b_{j-1}$ are all 0; or when k=L+1, determine that the HARQ process number of the first TB is i−L−1, where the first TB is one TB that comes first in the L TBs, and $L+1 \leq i \leq N+1$, use a $b_{L+1}$ bit as a start bit, determine that a bit state of a $b_i$ bit in the first field is 1, and determine that bit states of other j−1 bits other than the $b_i$ bit in $b_{L+1}$, $b_{L+2}$, ..., and $b_{N+1}$ are all 0.

In some embodiments of this application, the processing module is configured to: when k=0, determine that a bit state of a $b_{N+1-L}$ bit in the first field is 1; or when k=L+1, determine that a bit state of a $b_L$ bit in the first field is 1.

In some embodiments of this application, the processing module is configured to: indicate the NDI information of each of the L TBs by using L bits and a bitmap, where the L bits are $b_{j+1}$, $b_{j+2}$, ..., $b_{N+1}$ in the first field; or indicate the NDI information of each of the L TBs by using L bits and a bitmap, where the L bits are $b_0$, $b_1$, ..., $b_{L-1}$ in the first field.

In some embodiments of this application, the processing module is configured to: when determining that the downlink control information can be used to schedule both the newly transmitted TB and the retransmitted TB, determine that the downlink control information includes the first field, and set a bit state of a first bit in the downlink control information to 1, where the first bit is one bit.

In some embodiments of this application, the processing module is configured to: when determining that TBs that can be scheduled by using the downlink control information are only all newly transmitted TBs, or when determining that TBs that can be scheduled by using the downlink control information are only all retransmitted TBs, determine that the downlink control information does not include the first field; and set a bit state of a first bit in the downlink control information to 0, where the first bit is one bit.

In some embodiments of this application, the processing module is configured to: when the downlink control information is used to schedule a plurality of newly transmitted TBs, or when the downlink control information is used to schedule a plurality of retransmitted TBs, set a bit state of a second bit in the downlink control information to 1; or when the downlink control information can be used to schedule only one TB, set a bit state of a second bit in the downlink control information to 0, where the second bit is one bit.

In some embodiments of this application, the processing module is configured to: when the downlink control information is used to schedule a plurality of newly transmitted TBs, or when the downlink control information is used to schedule a plurality of retransmitted TBs, set a bit state of a second bit in the downlink control information to 1, where the second bit is one bit; or when the downlink control information can be used to schedule only one TB, determine that the downlink control information further includes a third bit, where the third bit is one bit, and set a bit state of the third bit to 0.

An embodiment of this application further provides a computer storage medium. The computer storage medium stores a program. The program is executed to perform some or all of the steps recorded in the method embodiments.

Figure 9:
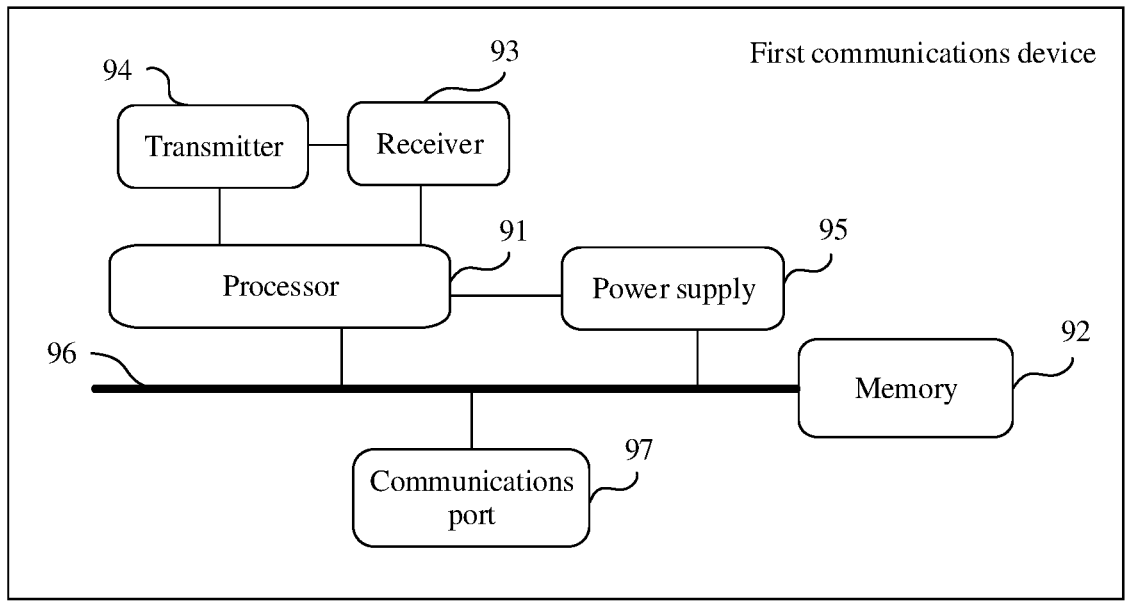
FIG. 9 is a schematic diagram of a composition structure of another terminal device according to an embodiment of this application.

FIG. 9 is a schematic diagram of a structure of still another first communications device according to an embodiment of this application. The first communications device is a terminal device, and the terminal device may include a processor 91 (for example, a CPU), a memory 92, a transmitter 94, and a receiver 93. The transmitter 94 and the receiver 93 are coupled to the processor 91, and the processor 91 controls a sending action of the transmitter 94 and a receiving action of the receiver 93. The memory 92 may include a high-speed RAM memory, or may include a non-volatile memory NVM, for example, at least one magnetic disk memory. The memory 92 may store various instructions, to implement various processing functions and implement method steps in embodiments of this application. Optionally, the terminal device in this embodiment may further include one or more of a power supply 95, a communications bus 96, and a communications port 97. The receiver 93 and the transmitter 94 may be integrated into a transceiver of the terminal device, or may be independent receive and transmit antennas of the terminal device. The communications bus 96 is configured to implement a communications connection between elements. The communications port 97 is configured to implement connection and communication between the terminal device and another peripheral.

In this embodiment, the memory 92 is configured to store computer executable program code, and the program code includes instructions. When the processor 91 executes the instructions, the instructions enable the processor 91 to perform the processing action of the terminal device in the method embodiment shown in FIG. 2, and enable the transmitter 94 to perform the sending action of the terminal device in the method embodiment. Implementation principles and technical effects thereof are similar. Details are not described herein again.

Figure 10:
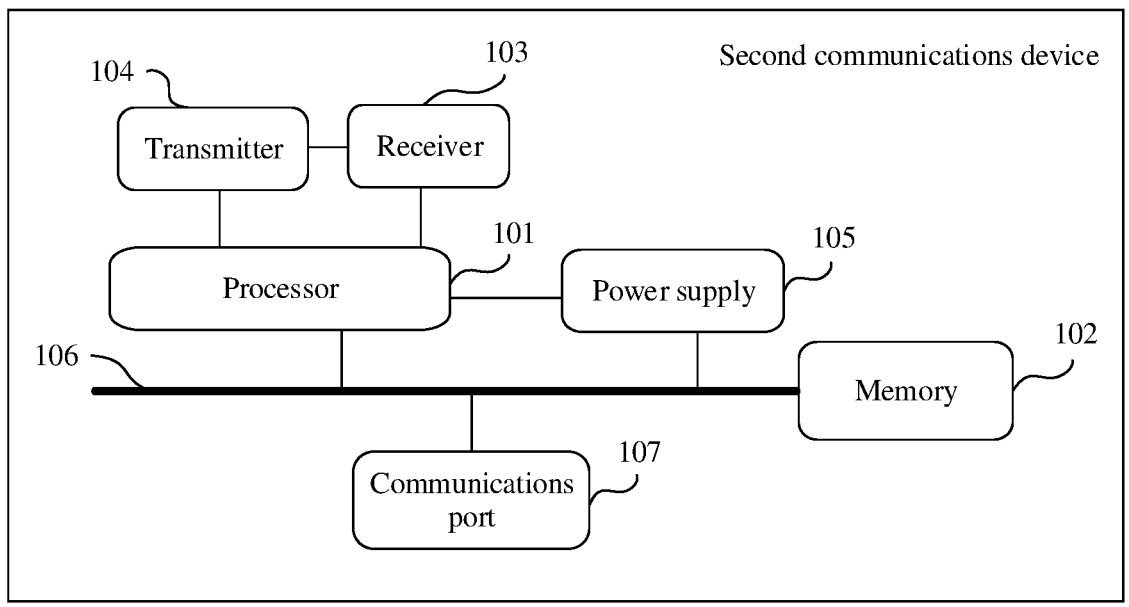
FIG. 10 is a schematic diagram of a composition structure of another network device according to an embodiment of this application.

FIG. 10 is a schematic diagram of a structure of still another second communications device according to an embodiment of this application. The second communications device is a network device, and the network device may include a processor (for example, a CPU) 101, a memory 102, a receiver 103, and a transmitter 104. The receiver 103 and the transmitter 104 are coupled to the processor 101, and the processor 101 controls a receiving action of the receiver 103 and a sending action of the transmitter 104. The memory 102 may include a high-speed RAM memory, or may include a non-volatile memory NVM, for example, at least one magnetic disk memory. The memory 102 may store various instructions, to implement various processing functions and implement method steps in embodiments of this application. Optionally, the network device in this embodiment may further include one or more of a power supply 105, a communications bus 106, and a communications port 107. The receiver 103 and the transmitter 104 may be integrated into a transceiver of the network device, or may be independent receive and transmit antennas of the network device. The communications bus 106 is configured to implement a communications connection between elements. The communications port 107 is configured to implement connection and communication between the network device and another peripheral.

In this embodiment, the memory 102 is configured to store computer executable program code, and the program code includes instructions. When the processor 101 executes the instructions, the instructions enable the processor 101 to perform the processing action of the network device in the method embodiment shown in FIG. 2, and enable the transmitter 104 to perform the sending action of the network device in the method embodiment. Implementation principles and technical effects thereof are similar. Details are not described herein again.

In another possible design, when a data transmission apparatus is a terminal device or a chip in a network device, the chip includes a processing unit and a communications unit. The processing unit may be, for example, a processor, and the communications unit may be, for example, an input/output interface, a pin, a circuit, or the like. The processing unit may execute computer-executable instructions stored in a storage unit, so that a chip in the terminal performs the wireless communications method according to any one of the implementations of the first aspect. Optionally, the storage unit is a storage unit in the chip, for example, a register or a cache. Alternatively, the storage unit may be a storage unit that is in the terminal and that is located outside the chip, for example, a read-only memory (ROM) or another type of static storage device that can store static information and instructions, for example, a random access memory (RAM).

The processor mentioned in any of the foregoing designs may be a general-purpose central processing unit (CPU), a microprocessor, an application-specific integrated circuit (ASIC), or one or more integrated circuits for controlling program execution of the wireless communications method according to the first aspect.

In addition, it should be noted that the described apparatus embodiments are merely examples. The units described as separate parts may or may not be physically separate, and parts displayed as units may or may not be physical units, and may be located in one position, or may be distributed on a plurality of network units. Some or all the modules may be selected based on an actual requirement to achieve the objectives of the solutions of embodiments. In addition, in the accompanying drawings of the apparatus embodiments provided in this application, connection relationships between the modules indicate that the modules have communications connections with each other, which may be specifically implemented as one or more communications buses or signal cables. A person of ordinary skill in the art may understand and implement embodiments without creative efforts.

Based on the description of the foregoing implementations, a person skilled in the art may clearly understand that this application may be implemented by software in addition to necessary universal hardware, or certainly may be implemented by dedicated hardware, including an application-specific integrated circuit, a dedicated CPU, a dedicated memory, a dedicated component, and the like. Generally, any function performed by a computer program can be easily implemented by using corresponding hardware, and a specific hardware structure used to achieve a same function may be of various forms, for example, in a form of an analog circuit, a digital circuit, an application-specific circuit, or the like. However, in this application, a software program implementation is a better implementation in most cases. Based on such an understanding, the technical solutions of this application essentially or the part contributing to the conventional technology may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in embodiments of this application.

All or some of foregoing embodiments may be implemented by using software, hardware, firmware, or any combination thereof. When the software is used to implement embodiments, all or a part of the embodiments may be implemented in a form of a computer program product.

The computer program product includes one or more computer instructions. When the computer program instructions are loaded and executed on the computer, the procedures or functions according to embodiments of this application are all or partially generated. The computer may be a general purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. An information processing method, comprising:
receiving, by a terminal device, downlink control information from a network device, wherein the downlink control information is capable of scheduling a maximum of N transport blocks (TBs), and N is a positive integer;
upon determining that the downlink control information comprises a first field, the first field comprises (N+2) bits, the (N+2) bits being $b_0, b_1, \ldots,$ and $b_{N+1}$,
determining, by the terminal device based on the first field, a quantity L of TBs scheduled by using the downlink control information, wherein L is a positive integer, and $1 \leq L \leq N$, wherein
when L is greater than 1, the L TBs scheduled by using the downlink control information is capable of comprising both a newly transmitted TB and a retransmitted TB; and
in j consecutive bits, a bit state of only one bit is 1, bit states of other j−1 bits are all 0, the j consecutive bits being $b_k, b_{k+1}, \ldots,$ and $b_{k+j-1}$ in the first field, j being a positive integer, j=N+1−L, k being a predefined integer, and k=0 or k=L+1, wherein k=0, a bit state of a $b_j$ bit in the first field is 1, and L consecutive bits carry new data indicator (NDI) information of the L TBs scheduled by using the downlink control information, the L consecutive bits being $b_{j+1}, b_{j+2}, \ldots,$ and $b_{N+1}$ in the first field; or
k=L+1, a bit state of a $b_L$ bit in the first field is 1, and L consecutive bits carry NDI information of the L TBs scheduled by using the downlink control information, the L consecutive bits being $b_0, b_1, \ldots,$ and $b_{L-1}$, in the first field;
determining, by the terminal device, a hybrid automatic repeat request (HARQ) process number of each of the L TBs; and
sending or receiving, by the terminal device, the L TBs based on the determined HARQ process number of each of the L TBs and the NDI information of each of the L TBs.

2. The method according to claim 1, wherein L, a HARQ process number of a first TB in the L TBs, and the NDI information of each of the L TBs are determined according to a correspondence between a bit state of the first field, a quantity of TBs, the HARQ process number of the first TB, and the NDI information of the L TB.

3. The method according to claim 1, wherein the determining, by the terminal device, a HARQ process number of each of the L TBs comprises:
using, by the terminal device, a $b_0$ bit as a start bit, determining that a $b_i$ bit is a first bit, whose bit state is 1, in the (N+2) bits, wherein a HARQ process number of a first TB in the L TBs is i, and determining, by the terminal device according to a first association relationship between the HARQ process number of the first TB and process numbers of L HARQ processes, a HARQ process number of another TB other than the first TB in the L TBs, wherein the L HARQ processes are HARQ processes corresponding to the L TBs; or
using, by the terminal device, a $b_{L+1}$ bit as a start bit, determining that a $b_i$ bit is a first bit, whose bit state is 1, in the (N+2) bits, wherein a HARQ process number of a first TB in the L TBs is i−L−1, and determining, by the terminal device according to a first association relationship between the HARQ process number of the first TB and process numbers of L HARQ processes, a HARQ process number of another TB other than the first TB in the L TBs, wherein the L HARQ processes are HARQ processes corresponding to the L TBs.

4. The method according to claim 1, further comprising:
using, by the terminal device, a $b_0$ bit as a start bit, and determining that a $b_m$ bit is a second bit, whose bit state is 1, in the (N+2) bits, wherein j=m, and L=N+1−m; or
using, by the terminal device, a $b_{N+1}$ bit as a start bit, and determining that a $b_m$ bit is a second bit, whose bit state is 1, from right to left in the (N+2) bits, wherein j=N+1−m, and L=m.

5. The method according to claim 1, wherein the NDI information of each of the L TBs is determined by using a bitmap based on L bits, the L bits being $b_{j+1}, b_{j+2}, \ldots,$ and $b_{N+1}$, or
$b_0, b_1, \ldots,$ and $b_{L-1}$.

6. An information processing method, comprising:
determining, by a network device, a quantity L of transport blocks (TBs) scheduled by using downlink control information, wherein the downlink control information is capable of scheduling a maximum of N TBs, N is a positive integer, L is a positive integer, and $1 \leq L \leq N$;
determining, by the network device, hybrid automatic repeat request (HARQ) process numbers of the L TBs;

determining, by the network device, new data indicator (NDI) information of the L TBs;

sending, by the network device, the downlink control information to a terminal device, wherein the downlink control information is capable of scheduling both a newly transmitted TB and a retransmitted TB, the downlink control information comprises a first field, and the first field comprises (N+2) bits, the (N+2) bits being $b_0, b_1, \ldots,$ and $b_{N+1}$; and in j consecutive bits, a state of only one bit is 1, states of other j−1 bits are all 0, the j consecutive bits being $b_k$, $b_{k+1}, \ldots,$ and $b_{k+j-1}$ in the first field, j being a positive integer, j=N+1−L, k being a predefined integer, and k=0 or k=L+1, wherein k=0, a bit state of a $b_j$ bit in the first field is 1, and L consecutive bits carry the NDI information of the L TBs scheduled by using the downlink control information, the L consecutive bits being $b_{j+1}, b_{j+2}, \ldots,$ and $b_{N+1}$ in the first field; or k=L+1, a bit state of a $b_L$ bit in the first field is 1, and L consecutive bits carry the NDI information of the L TBs scheduled by using the downlink control information, the L consecutive bits being $b_0, b_1, \ldots,$ and $b_{L-1}$, in the first field; and sending or receiving, by the network device, the L TBs based on the downlink control information.

7. The method according to claim 6, further comprising: determining, by the network device, one or more bit states of the first field according to a correspondence between a bit state of the first field, and L, a HARQ process number of a first TB in the L TBs, and the NDI information of each of the L TBs.

8. The method according to claim 6, further comprising: when k=0, determining, by the network device, that the HARQ process number of a first TB in the L TBs is i, wherein the first TB is one TB that comes first in the L TBs, and 0≤i≤j−1, using, by the network device, a $b_0$ bit as a start bit, and determining, by the network device, that a bit state of a $b_i$ bit in the first field is 1 and bit states of other j−1 bits other than the $b_i$ bit in $b_0, b_1, \ldots,$ wherein $b_{j-1}$ are all 0; or when k=L+1, determining, by the network device, that the HARQ process number of the first TB is i−L−1, wherein the first TB is one TB that comes first in the L TBs, and L+1≤i≤N+1, using, by the network device, a $b_{L+1}$ bit as a start bit, determining, by the network device, that a bit state of a $b_i$ bit in the first field is 1, and determining, by the network device, that bit states of other j−1 bits other than the $b_i$ bit in $b_{L+1}, b_{L+2}, \ldots,$ wherein $b_{N+1}$ are all 0.

9. The method according to claim 6, further comprising: when k=0, determining, by the network device, that a bit state of a $b_{N+1-L}$ bit in the first field is 1; or when k=L+1, determining, by the network device, that a bit state of a $b_L$ bit in the first field is 1.

10. The method according to claim 6, further comprising: indicating, by the network device, the NDI information of each of the L TBs by using L bits and a bitmap, wherein the L bits are $b_{j+1}, b_{j+2}, \ldots b_{N+1}$ or $b_0, b_1, \ldots, b_{L-1}$ in the first field.

11. A terminal device, comprising:

at least one processor; and a memory, coupled to the at least one processor, and storing computer program instructions that, when executed by the at least one processor, cause the terminal device to:

receive downlink control information from a network device, wherein the downlink control information is capable of scheduling a maximum of N transport blocks (TBs), and N is a positive integer;

upon determining that the downlink control information comprises a first field, the first field comprising (N+2) bits, wherein the (N+2) bits are $b_0, b_1, \ldots,$ and $b_{N+1}$, determine a quantity L of TBs scheduled by using the downlink control information based on the first field, wherein L is a positive integer, and 1≤L≤N, wherein:

when L is greater than 1, the L TBs scheduled by using the downlink control information is capable of comprising both a newly transmitted TB and a retransmitted TB;

in j consecutive bits, a bit state of only one bit is 1, bit states of other j−1 bits are all 0, the j consecutive bits being $b_k, b_{k+1},$ and $b_{N+j-1}$ in the first field, j being a positive integer, j=N+1−L, k being a predefined integer, and k=0 or k=L+1, wherein k=0, a bit state of a $b_j$ bit in the first field is 1, and L consecutive bits carry new data indicator (NDI) information of the L TBs scheduled by using the downlink control information, the L consecutive bits being $b_{j+1}, b_{j+2}, \ldots,$ and $b_{N+1}$ the first field; or k=L+1, a bit state of a $b_L$ bit in the first field is 1, and L consecutive bits carry NDI information of the L TBs scheduled by using the downlink control information, the L consecutive bits being $b_0, b_1, \ldots,$ and $b_{L-1}$, in the first field;

determine a hybrid automatic request (HARQ) process number of each of the L TBs; and send or receive the L TBs based on the determined HARQ process number of each of the L TBs and the NDI information of each of the L TBs.

12. The terminal device according to claim 11, wherein the instructions further cause the terminal device to: determine, based on a first bit in the downlink control information, whether the downlink control information comprises the first field, wherein the first bit is one bit; and when a bit state of the first bit is 1, determine that the downlink control information comprises the first field, wherein N is a positive integer greater than 1.

13. The terminal device according to claim 11, wherein the instructions further cause the terminal device to: determine, based on a first bit in the downlink control information, whether the downlink control information comprises the first field, wherein the first bit is one bit; when a bit state of the first bit is 0, determine that the downlink control information does not comprise the first field; determine that the downlink control information comprises a second bit, wherein the second bit is one bit; when a bit state of the second bit is 1, determine that the downlink control information is capable of scheduling a maximum of N TBs, wherein N is a positive integer greater than 1, and all TBs scheduled by using the downlink control information are newly transmitted TBs or retransmitted TBs; or when a bit state of the second bit is 0, determine that the downlink control information is capable of scheduling only one TB.

14. The terminal device according to claim 11, wherein the instructions further cause the terminal device to: determine, based on a first bit in the downlink control information, whether the downlink control information comprises the first field, wherein the first bit is one bit; when a bit state of the first bit is 0, determine that the downlink control information does not comprise the first field; determine that the downlink control information comprises a second bit, wherein the second bit is one bit; when a bit state of the second bit is 1, determine that the downlink control information is capable of scheduling the maximum of N TBs, wherein N is a positive integer greater than 1, and all TBs scheduled by using the downlink control information are newly transmitted TBs or retransmitted TBs; when a bit state of the second bit is 0, determine that the downlink control information further comprises a third bit, wherein the third bit is one bit, and a bit state of the third bit is fixed at 1; or determine, based on the third bit, that the downlink control information is capable of scheduling only one TB.

15. A network device, comprising:
at least one processor; and
a memory, coupled to the at least one processor, storing computer program instructions that, when executed by the at least one processor, cause the network device to:
determine a quantity L of transport blocks (TBs) scheduled by using downlink control information, wherein the downlink control information is capable of scheduling a maximum of N TBs, N is a positive integer, L is a positive integer, and $1 \leq L \leq N$;
determine hybrid automatic repeat request (HARQ) process numbers of the L TBs;
determine new data indicator (NDI) information of the L TBs;
send the downlink control information to a terminal device, wherein the downlink control information is capable of scheduling both a newly transmitted TB and a retransmitted TB, the downlink control information comprises a first field, and the first field comprises (N+2) bits, the (N+2) bits being $b_0, b_1, \ldots,$ and $b_{N+1}$; and
in j consecutive bits, a state of only one bit is 1, states of other j−1 bits are all 0, the j consecutive bit being $b_k$, $b_{k+1}, \ldots,$ and $b_{k+j-1}$ in the first field, j being a positive integer, j=N+1−L, k being a predefined integer, and k=0 or k=L+1, wherein
k=0, a bit state of a $b_j$ bit in the first field is 1, and L consecutive bits carry NDI information of the L TBs scheduled by using the downlink control information, the L consecutive bits being $b_{j+1}, b_{j+2}, \ldots,$ and $b_{N+1}$ in first field; or
k=L+1, a bit state of a $b_L$ bit in the first field is 1, and L consecutive bits carry NDI information of the L TBs scheduled by using the downlink control information, the L consecutive bits being $b_0, b_1, \ldots,$ and $b_{L-1}$, in the first field; and
send or receive the L TBs based on the downlink control information.

16. The network device according to claim 15, wherein the instructions, when executed by the at least one processor, further cause the network device to: indicate the NDI information of each of the L TBs by using L bits and a bitmap, wherein the L bits are $b_{j+1}, b_{j+2}, \ldots, b_{N+1}$ or $b_0, b_1, \ldots b_{L-1}$ in the first field.

17. The network device according to claim 15, wherein the instructions, when executed by the at least one processor, further cause the network device to: when determining that the downlink control information is capable of scheduling both the newly transmitted TB and the retransmitted TB, determine that the downlink control information comprises the first field, and set a bit state of a first bit in the downlink control information to 1, wherein the first bit is one bit.

18. The network device according to claim 15, wherein the instructions, when executed by the at least one processor, further cause the network device to: when determining that TBs that is capable of being scheduled by using the downlink control information are only all newly transmitted TBs or only all retransmitted TBs, determine that the downlink control information does not comprise the first field; and set a bit state of a first bit in the downlink control information to 0, wherein the first bit is one bit.

19. The network device according to claim 18, wherein the instructions, when executed by the at least one processor, further cause the network device to: when the downlink control information schedules a plurality of newly transmitted TBs or a plurality of retransmitted TBs, set a bit state of a second bit in the downlink control information to 1; or when the downlink control information is capable of scheduling only one TB, set a bit state of a second bit in the downlink control information to 0, wherein the second bit is one bit.

20. The network device according to claim 19, wherein the instructions, when executed by the at least one processor, further cause the network device to: when the downlink control information schedules a plurality of newly transmitted TBs or a plurality of retransmitted TBs, set a bit state of a second bit in the downlink control information to 1, wherein the second bit is one bit; or when the downlink control information is capable of scheduling only one TB, determine that the downlink control information further comprises a third bit, wherein the third bit is one bit, and set a bit state of the third bit to 0.

* * * * *